United States Patent
Kim et al.

(10) Patent No.: US 11,736,823 B2
(45) Date of Patent: Aug. 22, 2023

(54) INTEGRATED HIGH-SPEED IMAGE SENSOR AND OPERATION METHOD THEREOF

(71) Applicants: SAMSUNG ELECTRONICS CO., LTD., Suwon-si (KR); Research & Business Foundation SUNGKYUNKWAN UNIVERSITY, Suwon-si (KR)

(72) Inventors: Woo-Shik Kim, Seongnam-si (KR); Jonghwan Ko, Daejeon (KR)

(73) Assignees: SAMSUNG ELECTRONICS CO., LTD., Suwon-si (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 35 days.

(21) Appl. No.: 17/500,538

(22) Filed: Oct. 13, 2021

(65) Prior Publication Data
US 2022/0141401 A1 May 5, 2022

(30) Foreign Application Priority Data

Nov. 3, 2020 (KR) .................. 10-2020-0145530
Jun. 28, 2021 (KR) .................. 10-2021-0084159

(51) Int. Cl.
  *H04N 25/50* (2023.01)
  *G06T 7/215* (2017.01)
  *H04N 25/75* (2023.01)

(52) U.S. Cl.
  CPC ............ *H04N 25/50* (2023.01); *G06T 7/215* (2017.01); *H04N 25/75* (2023.01)

(58) Field of Classification Search
  None
  See application file for complete search history.

(56) References Cited

U.S. PATENT DOCUMENTS 8,089,522 B2  1/2012  Choi et al.
8,625,016 B2  1/2014  Fossum et al.
9,135,963 B2  9/2015  Jung et al.
(Continued)

FOREIGN PATENT DOCUMENTS

EP        3425898 A1     1/2019
KR      10-1295683 B1    8/2013
(Continued)

OTHER PUBLICATIONS

Yang, et al., "Comparative Analysis of SNR for Image Sensors with Enhanced Dynamic Range", 1999, Part of the IS&T/SPIE Conference on Sensors, Cameras, and Systems for Scientific/Industrial Applications, SPIE vol. 3649, 15 pages total.
(Continued)

*Primary Examiner* — Mark T Monk
(74) *Attorney, Agent, or Firm* — Sughrue Mion, PLLC

(57) ABSTRACT

An integrated high-speed image sensor includes a pixel array; a processor configured to determine a region of interest (ROI) and a region of non-interest (RONI) of the pixel array; an analog signal processing circuit configured to read out ROI image data at a first frame rate and read out RONI image data at a second frame rate; and a memory storing the ROI image data and the RONI image data.

15 Claims, 20 Drawing Sheets

(56) References Cited

U.S. PATENT DOCUMENTS

| | | | |
|---|---|---|---|
| 9,628,738 | B2 | 4/2017 | Chen |
| 10,691,969 | B2 | 6/2020 | Xiong et al. |
| 11,223,761 | B2 | 1/2022 | Kim et al. |
| 2009/0066782 | A1 | 3/2009 | Choi et al. |
| 2014/0007148 | A1* | 1/2014 | Ratliff ............... H04N 21/44 725/12 |
| 2016/0071711 | A1* | 3/2016 | Ikegami ............ H01J 49/0036 250/281 |
| 2018/0270445 | A1 | 9/2018 | Khandelwal et al. |
| 2022/0141412 | A1 | 5/2022 | Kim |

FOREIGN PATENT DOCUMENTS

| | | |
|---|---|---|
| KR | 10-1709941 B1 | 2/2017 |
| KR | 10-1921964 B1 | 2/2019 |
| KR | 10-2020-0027276 A | 3/2020 |
| WO | 2008136007 A2 | 11/2008 |

OTHER PUBLICATIONS

Zhao, et al., "A CMOS Image Sensor with on-chip Motion Detection and Object Localization", 2011, IEEE Xplore, 4 pages total.

Srivastava, et al., "Combining Low and Mid-Level Gaze Features for Desktop Activity Recognition", 2018, Proc. ACM Interact. Mob. Wearable Ubiquitous Technol., vol. 2, No. 4, Article 189, 27 pages total.

"Sony's Sensor Evolution", 2015, Giggle Hardware Digital Camera Forum, 9 pages total, https://gigglehd.com/zbxe/13079731.

"CMOS", 2010, HelloT Magazine, 21 pages total, http://magazine.hellot.net/magz/article/articleDetail.do?flag=all&showType=showType1&articleId=ARTI_000000000037061&articleAllListSortType=sort_1&page=1&selectYearMonth=201003&subCtgId.

Communication dated Feb. 25, 2022 issued by the European Patent Office in application No. 21205961.2.

Zhao, B., et al., "A 64–64 CMOS Image Sensor with On-chip Moving Object Detection and Localization", IEEE Transactions on Circuits and Systems for Video Technology, Jan. 1, 2012, pp. 1-9.

* cited by examiner

[Security]

INTEGRATED HIGH-SPEED IMAGE SENSOR AND OPERATION METHOD THEREOF

CROSS-REFERENCE TO RELATED APPLICATION

This application is based on and claims priority under 35 U.S.C. § 119 to Korean Patent Application No. 10-2020-0145530, filed on Nov. 3, 2020, in the Korean Intellectual Property Office, and Korean Patent Application No. 10-2021-0084159, filed on Jun. 28, 2021, in the Korean Intellectual Property Office, the disclosures of which are incorporated by reference herein in their entireties.

BACKGROUND

1. Field

Apparatuses and methods consistent with example embodiments relate to integrated high-speed image sensors and operation methods thereof.

2. Description of Related Art

High-speed image sensors are capable of capturing an image at a high frame rate or a low exposure time. For example, a high-speed image sensor having a maximum frame rate of 960 frames/s may capture an image at a speed 32 times faster than a normal image sensor having a maximum frame rate of 30 frames/s.

In general, an image sensor reads out output signals of pixels in units of rows. Due to the time required to sequentially read out output signals of all rows, the maximum frame rate of a high-speed image sensor may be limited.

To compensate for the time required to read out the output signals of pixels in units of rows, a method of reading out a plurality of rows through pixel binning has been developed. However, this method has a problem in that the resolution of an image deteriorates.

SUMMARY

One or more example embodiments provide integrated high-speed image sensors and operation methods thereof.

According to an aspect of an example embodiment, an integrated image sensor may include: a pixel array; a processor configured to determine a region of interest (ROI) and a region of non-interest (RONI) of the pixel array; an analog signal processing circuit configured to read out ROI image data at a first frame rate from the ROI of the pixel array and read out RONI image data at a second frame rate from the RONI of the pixel array; and a memory storing the ROI image data and the RONI image data.

The processor may be further configured to determine the ROI of the pixel array based on a motion detection between consecutive image frames or based on an object detection from an image frame.

The processor may be further configured to determine the ROI of the pixel array based on a motion detection between consecutive image frames detected via digital image processing.

The processor may be further configured to determine the ROI of a current image frame based on a previous ROI of a previous image frame.

The processor may be further configured to, when a current image frame satisfies a previously determined condition, determine the ROI of the pixel array as an area in which an object is detected based on digital image processing of the current image frame, and when the current image frame does not satisfy the previously determined condition, determine the ROI of the pixel array as an area in which a motion is detected based on analog signal processing of the current image frame and a previous image frame.

The processor may be further configured to, when a current image frame is based on the RONI image data read out at the second frame rate, determine the ROI of the pixel array as an area in which an object is detected based on digital image processing of the current image frame, and when the current image frame is not based on the RONI image data read out at the second frame rate, determine the ROI of the pixel array as an area in which a motion based on analog signal processing of the current image frame and a previous image frame.

The analog signal processing circuit may include a motion detecting circuit configured to calculate a difference between a first output signal of the pixel array corresponding to a current image frame and a second output signal of the pixel array corresponding to a previous image frame, and detect a motion between the current image frame and the previous image frame based on the difference between the first output signal and the second output signal. The processor may be further configured to determine the ROI based on the detected motion.

The integrated image sensor may further include a column selector circuit configured to output a column selection signal corresponding to columns of the pixels of the ROI. The analog signal processing circuit may include a readout circuit configured to image read out based on the column selection signal.

The processor may be further configured to detect an object of an image frame based on machine learning.

The processor may be further configured to generate entire region image data by combining the ROI image data and the RONI image data.

The processor may be further configured to generate the entire region image data based on image registration.

The processor may be further configured to selectively output the ROI image data and the entire region image data.

The processor may be further configured to correct the ROI image data or the RONI image data to allow the ROI image data and the RONI image data to be combined as a single seamless image frame.

The processor may be further configured to compress the ROI image data or the RONI image data, and the memory may store the compressed ROI image data or the compressed RONI image data.

The processor may be further configured to compress the ROI image data based on a motion between consecutive image frames.

The processor may be further configured to read the ROI image data or the RONI image data stored in the memory, and decompress the read ROI image data or the read RONI image data.

The processor may be further configured to determine the ROI such that a size of the ROI is less than a previously determined maximum size, wherein a current maximum size of the ROI may be inversely proportional to the first frame rate.

According to an aspect of another example embodiment, an operation method of an integrated image sensor may include: determining a region of interest (ROI) and a region of non-interest (RONI) of a pixel array; reading out ROI image data from the ROI of the pixel array at a first frame rate; reading out RONI image data the RONI of the pixel array at a second frame rate; and storing the ROI image data and the RONI image data.

The determining of the ROI and the RONI the pixel array may include determining the ROI of the pixel array as an area in which a motion is detected based on analog signal processing of consecutive image frames or determining the ROI of the pixel array as an area in which an object is detected based on digital image processing of a current image frame.

According to an aspect of another example embodiment, an image sensor may include: a pixel array; a processor configured to determine a region of interest (ROI) and a region of non-interest (RONI) of the pixel array; and an analog signal processing circuit including a row selector configured to activate the pixel arrays row by row, and a column selector configured to read out ROI image data from the ROI of the pixel array at a first frame rate and read out RONI image data from the RONI of the pixel array at a second frame rate that is lower than the first frame rate, wherein the processor may be further configured to combine the ROI image data and the RONI image data as a single image frame.

BRIEF DESCRIPTION OF THE DRAWINGS

The above and/or other aspects will be more apparent by describing certain example embodiments, with reference to the accompanying drawings, in which.

DETAILED DESCRIPTION

Figure 1:
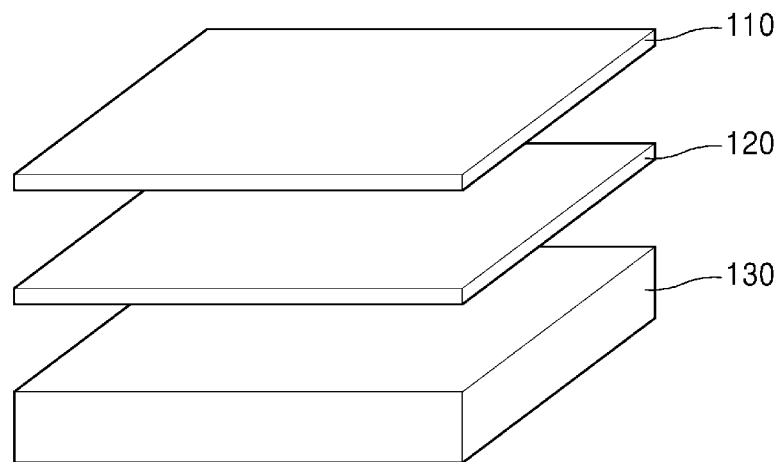
FIG. 1 shows an integrated high-speed image sensor according to an example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list.

The terms used in the present disclosure are selected based on general terms currently widely used in the art in consideration of functions regarding the present disclosure, but the terms may vary according to the intention of those of ordinary skill in the art, precedents, or new technology in the art. Also, some terms may be arbitrarily selected by the applicant, and in this case, the meaning of the selected terms will be described in the detailed description of the present disclosure. Thus, the terms used herein should not be construed based on only the names of the terms but should be construed based on the meaning of the terms together with the description throughout the present disclosure.

Terms such as "including" or "comprising" used in the embodiments should not be construed as necessarily including all of various components, or various operations described in the specification, and it should be construed that some of the components or some of the operations may not be included or may further include additional components or operations.

Hereinafter, the present disclosure will now be described more fully with reference to the accompanying drawings. The disclosure may, however, be embodied in many different forms and should not be construed as being limited to the embodiments set forth herein.

FIG. 1 shows an integrated high-speed image sensor 100 according to an example embodiment.

In an example embodiment, the integrated high-speed image sensor 100 includes a pixel layer 110, a memory layer 120, and a logic layer 130. The integrated high-speed image sensor 100 may be a system on chip. When the integrated high-speed image sensor 100 is implemented as the system on chip, the layers 110, 120, and 130 may be arranged in a horizontal or vertical structure. In addition, the logic layer 130 may be divided according to functions and disposed in a different location. For example, the integrated high-speed image sensor 100 may be implemented as the system on chip by connecting the layers 110, 120, and 130 through a through silicon via (TSV), but is not limited thereto.

The pixel layer 110 may be configured to capture an image. The pixel layer 110 may include a pixel array based on a charge coupled device (CCD) or a complementary metal oxide semiconductor (CMOS).

The memory layer 120 may be configured to store image data. Because the memory layer 120 is integrated in the integrated high-speed image sensor 100, the integrated high-speed image sensor 100 may include a memory having a capacity to store image data and/or programs.

The logic layer 130 may be configured to control operations of the pixel layer 110 and the memory layer 120 and to perform digital image processing. The logic layer 130 may include a processor for digital signal processing an analog signal processing circuit for digital signal processing.

The integrated high-speed image sensor 100 may include the memory layer 120 and the logic layer 130 integrated in the pixel layer 110, thereby performing various operations. For example, the logic layer 130 may read image data stored in the memory layer 120 to perform image registration, object detection, etc. For another example, the logic layer 130 may control the pixel layer 110 such that region of interest (ROI) image data and region of non-interest (RONI) image data may be obtained at different frame rates. The integrated high-speed image sensor 100 may support a slow motion mode (also referred to as "high-speed photograph") in which image frames are captured at a frame rate faster than it will be played back. The integrated high-speed image sensor 100 may include a column selector in addition to a row selector so that different frame rates can be set to different pixel areas (e.g., an ROI and an RONI) in a pixel array, in order to increase a maximum frame rate and a maximum recording time in the slow motion mode.

The integrated high-speed image sensor 100 may be used in various platforms such as digital cameras, smart phones, PCs, laptops, portable devices, wearable devices, and vehicles.

Figure 2:
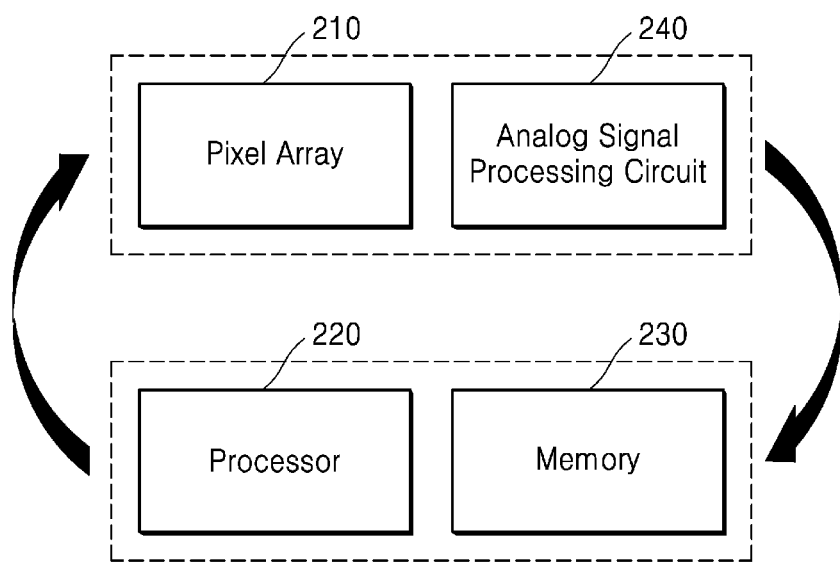
FIG. 2 is a diagram showing components of an integrated high-speed image sensor according to an example embodiment.

FIG. 2 is a diagram showing components of an integrated high-speed image sensor 200 according to an example embodiment.

The integrated high-speed image sensor 200 according to an example embodiment includes a pixel array 210, a processor 220, a memory 230, and an analog signal processing circuit 240. The integrated high-speed image sensor 200 may further include other analog circuits such as a row selector circuit and a column selector circuit (see FIG. 3).

The pixel array 210 may be configured to capture an image. In an example embodiment, the pixel array 210 is implemented as a CMOS transistor, and the integrated high-speed image sensor 200 is classified as a CMOS image sensor (CIS). The embodiment is not limited thereto, and it is obvious to those of ordinary skill in the art that the integrated high-speed image sensor 200 may be implemented as a CCD image sensor in another example embodiment.

The processor 220 may be configured to determine an ROI of the pixel array 210 and perform digital image processing. Also, the processor 220 may determine an RONI of the pixel array 210. In this regard, determining the RONI of the pixel array 210 includes regarding the remaining region as the RONI by determining the ROI of the pixel array 210.

The processor 220 may be implemented as an array of a plurality of logic gates. Also, the processor 220 may be implemented as a combination of a microprocessor and a memory in which a program executable in the microprocessor is stored. Further, the processor 220 may include a hardware accelerator configured to perform machine learning.

Meanwhile, the processor 220 may be implemented to include at least one processor (or processing unit). In addition, it may be understood by those of ordinary skill in the art that the processor 220 may be implemented as different types of hardware configurations.

The memory 230 may be configured to store image data. The memory 230 may be configured to store image data captured by the pixel array 210 and image data on which digital image processing is performed by the processor 220. For example, the memory 230 may be implemented to have a capacity of GB. For example, the memory 230 may be implemented as a dynamic random access memory (DRAM), but is not limited thereto.

The analog signal processing circuit 240 may be configured to read out ROI image data at a first frame rate based on output signals of pixels of the ROI of the pixel array 210, and read out RONI image data at a second frame rate based on output signals of pixels of the RONI of the pixel array 210.

Also, the analog signal processing circuit 240 may be configured to read out the ROI image data at the first frame rate based on the output signals of the pixels of the ROI of the pixel array 210, and read out entire region image data at the second frame rate based on output signals of pixels of the entire region of the pixel array 210.

In an example embodiment, the RONI of the pixel array 210 refers to the remaining region of the pixel array 210 excluding the ROI. In another example embodiment, an RONI may be a sub region different from an ROI of a pixel array.

In an example embodiment, the ROI of the pixel array 210 corresponds to an ROI of an image, and the RONI of the pixel array 210 corresponds to an RONI of the image. That is, the output signals of the pixels of the ROI of the pixel array 210 are read out, and thus the ROI image data is output, and the output signals of the pixels of the RONI of the pixel array 210 are read out, and thus the RONI image data is output.

The first frame rate may be greater than the second frame rate. For example, the first frame rate may be a high-speed frame rate (e.g., 340-960 frames per second), and the second frame rate may be a normal frame rate (e.g., 30 frames per second). For another example, the first frame rate may be a higher fast frame rate, and the second frame rate may be a lower fast frame rate. For example, the first frame rate may be 240 frames/s and the second frame rate may be 30 frames/s, or the first frame rate may be 480 frames/s and the second frame rate may be 240 frames/s, but the embodiment is not limited thereto.

The output signals of the pixels of the ROI of the pixel array 210 are read out at the first frame rate, and thus the ROI image data may be obtained at the first frame rate. The output signals of the pixels of the RONI of the pixel array 210 are read out the second frame rate, and thus the RONI image data may be obtained at the second frame rate.

In an example embodiment, the analog signal processing circuit 240 transmits image data and motion detection signals to the processor 220 and/or the memory 230. The processor 220 determines the ROI based on the image data and a motion detection signal. The processor 220 controls the pixel array 210 and/or the analog signal processing circuit 240 such that the ROI image data is captured at the first frame rate and the RONI image data is captured at the second frame rate.

Figure 3:
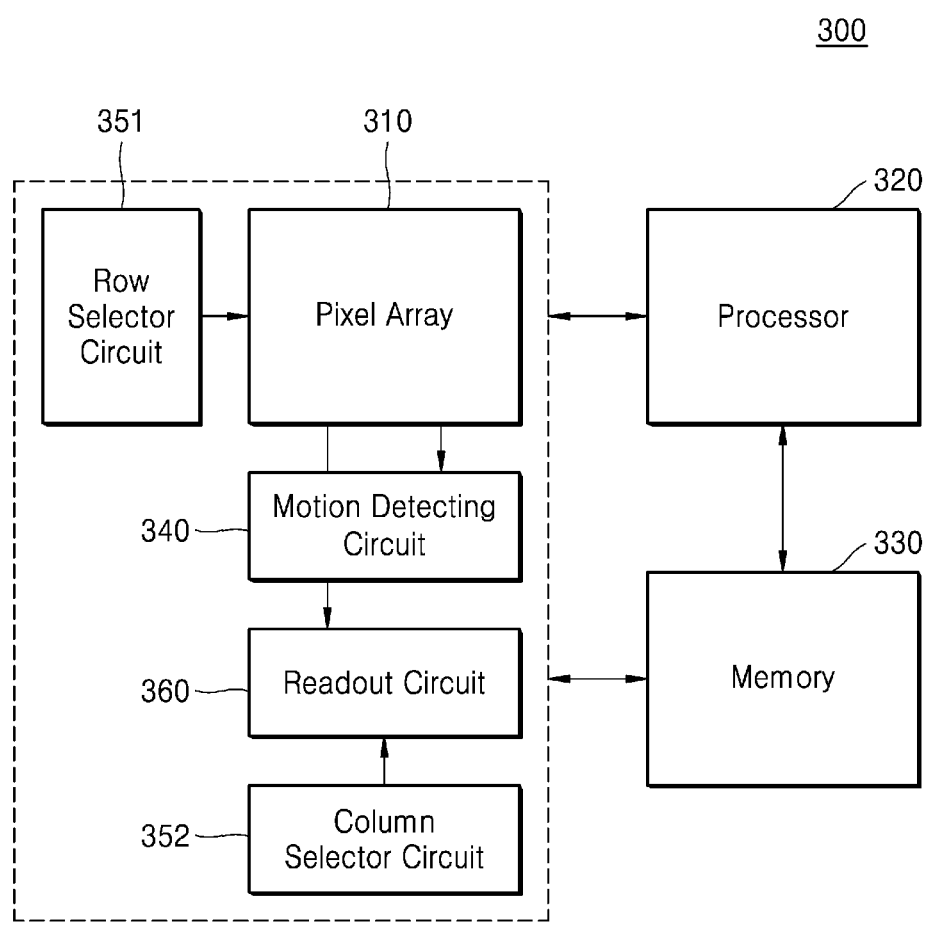
FIG. 3 is a diagram showing components of an integrated high-speed image sensor according to an example embodiment.

FIG. 3 is a diagram showing components of an integrated high-speed image sensor 300 according to an example embodiment.

The integrated high-speed image sensor 300 according to an example embodiment includes a pixel array 310, a processor 320, a memory 330, a row selector circuit 351, a column selector circuit 352, and an analog signal processing circuit. The analog signal processing circuit according to an example embodiment includes a motion detecting circuit 340 and a readout circuit 360.

The processor 320 may be configured to determine an ROI of the pixel array 310 based on a motion between image frames detected based on analog signal processing or an object of an image frame detected based on digital image processing. Also, the processor 320 may be configured to determine a first frame rate and a second frame rate. In an example embodiment, an RONI of the pixel array 310 is determined as a region other than the ROI.

The row selector circuit 351 is configured to activate pixels in units of rows based on the ROI and the first and second frame rates determined by the processor 320.

The column selector circuit 352 may be configured to output a column selection signal for readout based on the ROI and the first and second frame rates determined by the processor 320.

The readout circuit 360 may be configured to perform an image readout based on a column selection signal. Specifically, the readout circuit 360 may be configured to read out output signals of pixels of all columns, output signals of pixels of the RONI, or output signals of pixels of a column of the ROI based on the column selection signal.

The motion detecting circuit 340 may be configured to detect the motion between the image frames based on analog signal processing. Specifically, the motion detecting circuit 340 may be configured to output the motion detection signal indicating a motion between a current image frame and a previous image frame based on a difference between an output signal (i.e., a voltage signal) of a pixel array of the current image frame and an output signal of a pixel array of the previous image frame.

The integrated high-speed image sensor 300 may further include a timing generating circuit. The row select circuit 351, the column select circuit 352, the motion detecting circuit 340, and/or the readout circuit 360 may be controlled by the timing generating circuit to sequentially perform a series of operations. The timing generation circuit may be replaced with or implemented by the processor 320.

The processor 320 may determine an ROI of the pixel array 310 based on the motion detection signal received from the motion detecting circuit 340. Alternatively, the processor 320 may determine the ROI of the pixel array 310 based on the image data received from the readout circuit 360.

The memory 360 may store the image data output from the readout circuit 360. In addition, the memory 330 may store image data processed by the processor 320 or a program executed by the processor 320.

The memory 330 may store the previous image frame. The memory 330 may store all or part of the previous image frame. The processor 320 may perform motion detection or object detection/tracking by comparing all or part of the previous image frame with all or part of the current image frame using digital processing. Also, the memory 330 may store location information of an ROI of the previous image frame. The processor 320 may determine an ROI of the current image frame with reference to the location information of the ROI of the previous image frame.

Figure 4:
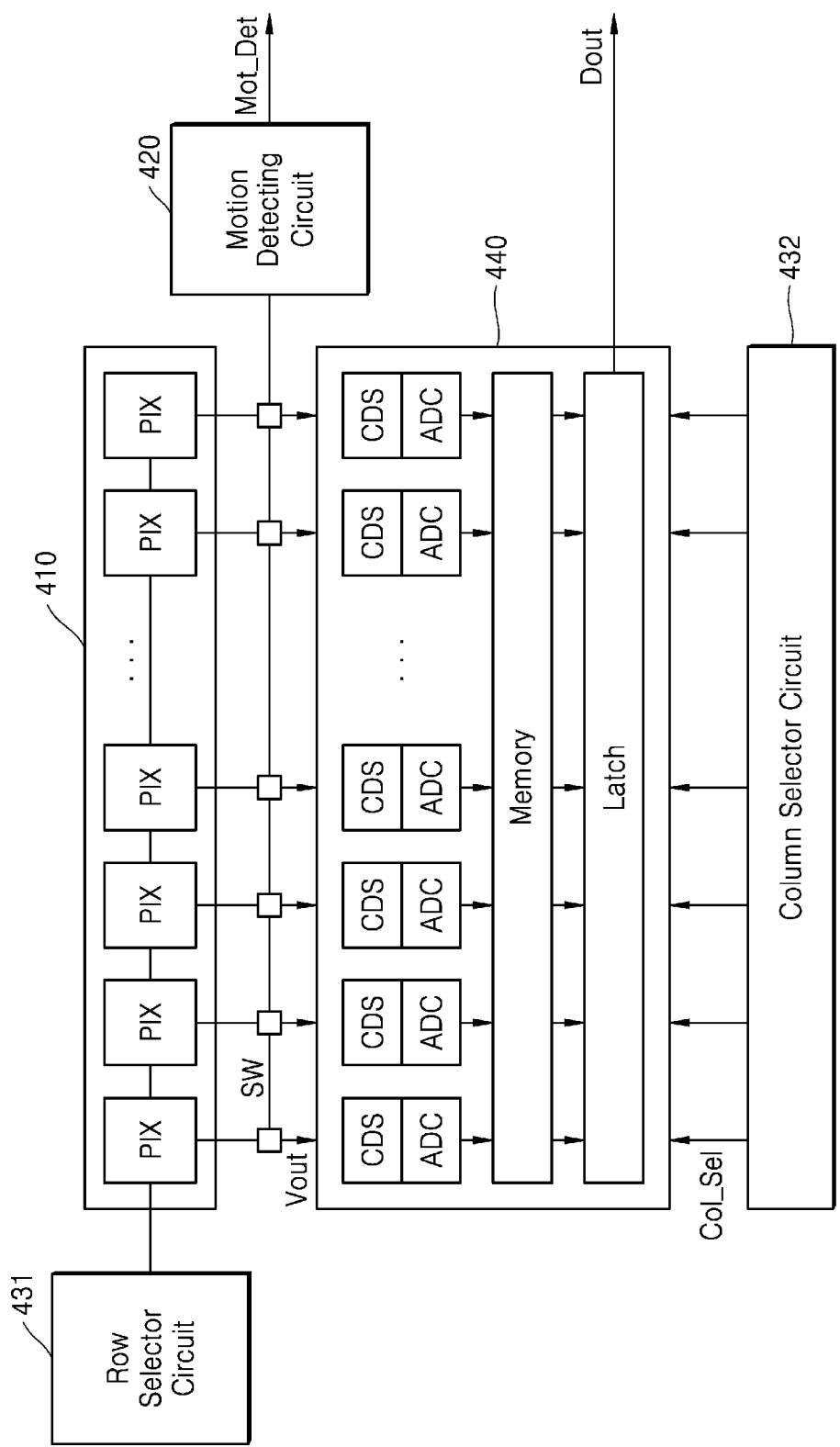
FIG. 4 is a diagram showing an image readout according to an example embodiment.

FIG. 4 is a diagram showing an image readout according to an example embodiment.

Pixels 410 of a row selected by a row selector circuit 431 may be activated. The pixels 410 may output a voltage corresponding to light as an output signal Vout. The output signal Vout of the pixels 410 may be transmitted to a motion detecting circuit 420 and a readout circuit 440.

The motion detecting circuit 420 may output a motion detection signal Mot_Det by comparing an output signal of a current image frame with an output signal of a previous image frame. The motion detecting circuit 420 may output the motion detection signal Mot_Det carrying information of the difference between the output signal of the current image frame and the output signal of the previous image frame, and the processor 320 may determine whether a moving object has been captured in the consecutive image frames (i.e., the previous image frame and the second image frame) base on the motion detection signal Mot_Det.

Only output signals of pixels in a specific region may be transmitted to the motion detecting circuit 420. For example, a switch SW that operates based on a column selection signal Col_Sel is disposed between an output node of the pixels 410 and an input node of the motion detecting circuit 420, and thus only output signals of pixels in the specific region may be transmitted to the motion detecting circuit 420. The specific region may be an ROI, or the combination of the ROI and a surrounding region thereof, but is not limited thereto.

A column selector circuit 432 may output the column selection signal Col_Sel corresponding to columns of pixels of the ROI such that ROI image data is read out. Alternatively, the column selector circuit 432 may output the column selection signal Col_Sel corresponding to all columns such that entire region image data is read out. Alternatively, the column selector circuit 432 may output the column selection signal Col_Sel corresponding to columns of pixels of an RONI such that RONI image data is read out.

The readout circuit 440 may read out the ROI image data, the RONI image data, or the entire region image data based on the column selection signal Col_Sel. In addition, the readout circuit 440 may read out the ROI image data at a first frame rate, and read out the RONI image data or the entire region image data at a second frame rate, based on the column selection signal Col_Sel. The image data Dout output from the readout circuit 440 may be transmitted to a processor and/or a memory.

In addition, correlated double sampling (CDS) circuit and ADC of the readout circuit 440 may be configured to double sample and convert output signals of pixels of columns of the ROI, output signals of pixels of columns of the RONI, or output signals of pixels of all columns based on the column selection signal Col_Sel. However, when the CDS circuit performs double sampling in parallel, there may be no difference between the time required to double sample output signals of pixels of columns of the ROI and the time required to double sample output signals of pixels of all columns. Accordingly, the CDS circuit may be configured to double sample the output signals of the pixels of all columns, regardless of the column selection signal Col_Sel. The ADC may be configured in the same manner as the CDS circuit.

A memory and a latch of the readout circuit 440 may be configured to read and latch output signals of pixels of columns of a digitized ROI, output signals of pixels of columns of a digitized RONI, or output signals of pixels of all digitized columns based on the column selection signal Col_Sel. For example, the readout circuit 440 may include a plurality of memories, and image data read from memories selected by the column selection signal Col_Sel may be latched and transmitted to a processor. For example, the memory of the readout circuit 440 may be static random access memory (SRAM), but is not limited thereto.

In FIG. 4, the readout circuit 440 includes the CDS circuit, the ADC, the memory, and the latch, but is not limited thereto. For example, the readout circuit 440 may further include a CDS circuit electrically connected to an output terminal of the ADC, or may include a programmable gain amplifier (PGA). For another example, the readout circuit 440 may be configured to include CDS circuits connected in parallel and ADCs connected in series.

Figure 5:
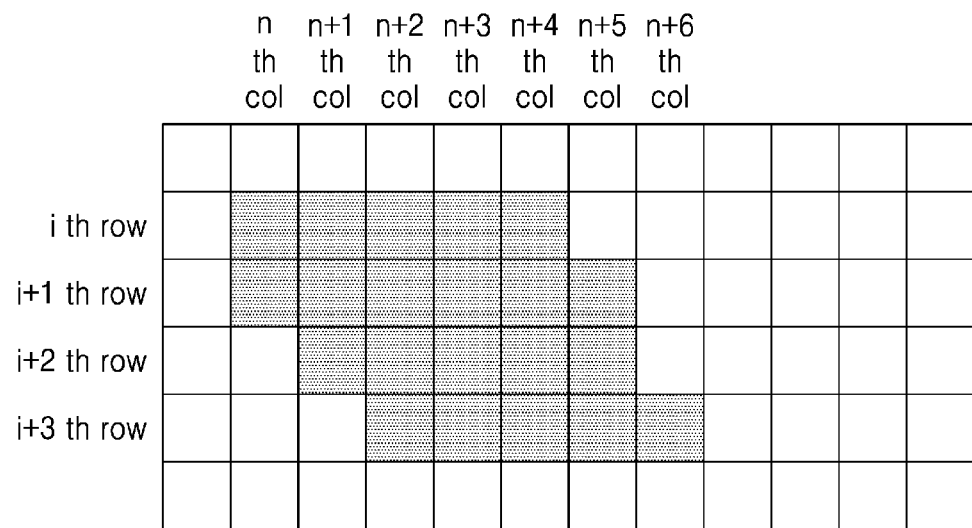
FIG. 5 is a diagram showing a region of interest (ROI) of a pixel array according to an example embodiment.

FIG. 5 is a diagram showing an ROI of a pixel array according to an example embodiment.

In FIG. 5, a dark region indicates the ROI of the pixel array. ROIs of various shapes may be implemented by a row selector circuit and a column selector circuit.

For example, output signals of pixels in n-th to n+4th columns may be read out by the column selector circuit with respect to pixels in an i-th row activated by the row selector circuit, output signals of pixels in n-th to n+5th columns may be read out with respect to pixels in an activated i+1th row, output signals of pixels in n+1th to n+5th columns may be read out with respect to pixels in an activated i+2th row, and output signals of pixels in n+2th to n+6th columns may be read out with respect to pixels in an activated i+3th row.

That is, because it is possible to selectively activate pixels in units of rows and selectively read out output signals of pixels in units of columns, ROIs of various shapes may be implemented.

Figure 6:
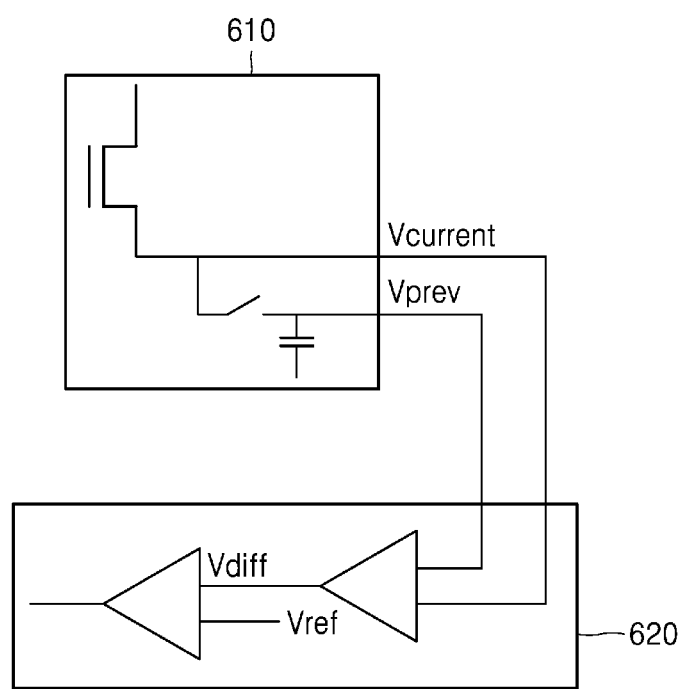
FIG. 6 is a diagram showing motion detection between image frames based on analog signal processing according to an example embodiment.

FIG. 6 is a diagram showing motion detection between image frames based on analog signal processing according to an example embodiment.

For convenience of description, a motion detecting circuit 620 electrically connected to one pixel 610 is illustrated in FIG. 6. The motion detecting circuit 620 may be electrically connected to a plurality of pixels of a pixel array.

The motion detecting circuit 620 may be configured to detect the motion between a current image frame (e.g., a pixel of the current image frame) and a previous image frame (e.g., a corresponding pixel of the previous image frame) based on an output signal of the pixel array corresponding to the current image frame and an output signal of the pixel array corresponding to the previous image frame. In this case, the output signal of the pixel array may be a voltage.

In an example embodiment, the pixel 610 may be configured to store the output signal corresponding to the previous image frame. For example, the pixel 610 may include an analog memory such as a capacitor storing the output signal corresponding to the previous image frame. For another example, the pixel 610 may be configured to store the output signal corresponding to the previous image frame without additional analog memory. For this, the pixel 610 may have a dual well or a dual pixel structure.

The motion detecting circuit 620 may be configured to calculate a difference between an output signal Vcurrent corresponding to the current image frame and an output signal Vprev corresponding to the previous image frame, and compare the calculated difference Vdiff with a reference value Vref. For example, the motion detecting circuit 620 may be configured to compare the calculated difference Vdiff with a positive reference value and a negative reference value.

The motion detecting circuit 620 may output a motion detection signal based on a result of comparing the difference Vdiff and the reference value Vref. The motion detection signal may be a 1 bit signal. For example, the motion detection signal may be a 1 bit signal having a value of 0 when the difference Vdiff is less than the reference value Vref and a 1 bit signal having a value of 1 when the difference Vdiff is greater than the reference value Vref. For another example, the motion detection signal may be a 1 bit signal having a value of 0 when the difference Vdiff is less than the positive reference value and greater than the negative reference value, and a 1 bit signal having a value of 1 when the difference Vdiff is greater than the positive reference value and less than the negative reference value.

The motion detecting circuit 620 may transmit the motion detection signal to a processor. The processor may determine an ROI of the pixel array based on the motion detection signal.

Because the motion detecting circuit 620 is configured to detect the motion between image frames from the output signal of the pixel array, the motion may be detected at high speed.

Figure 7:
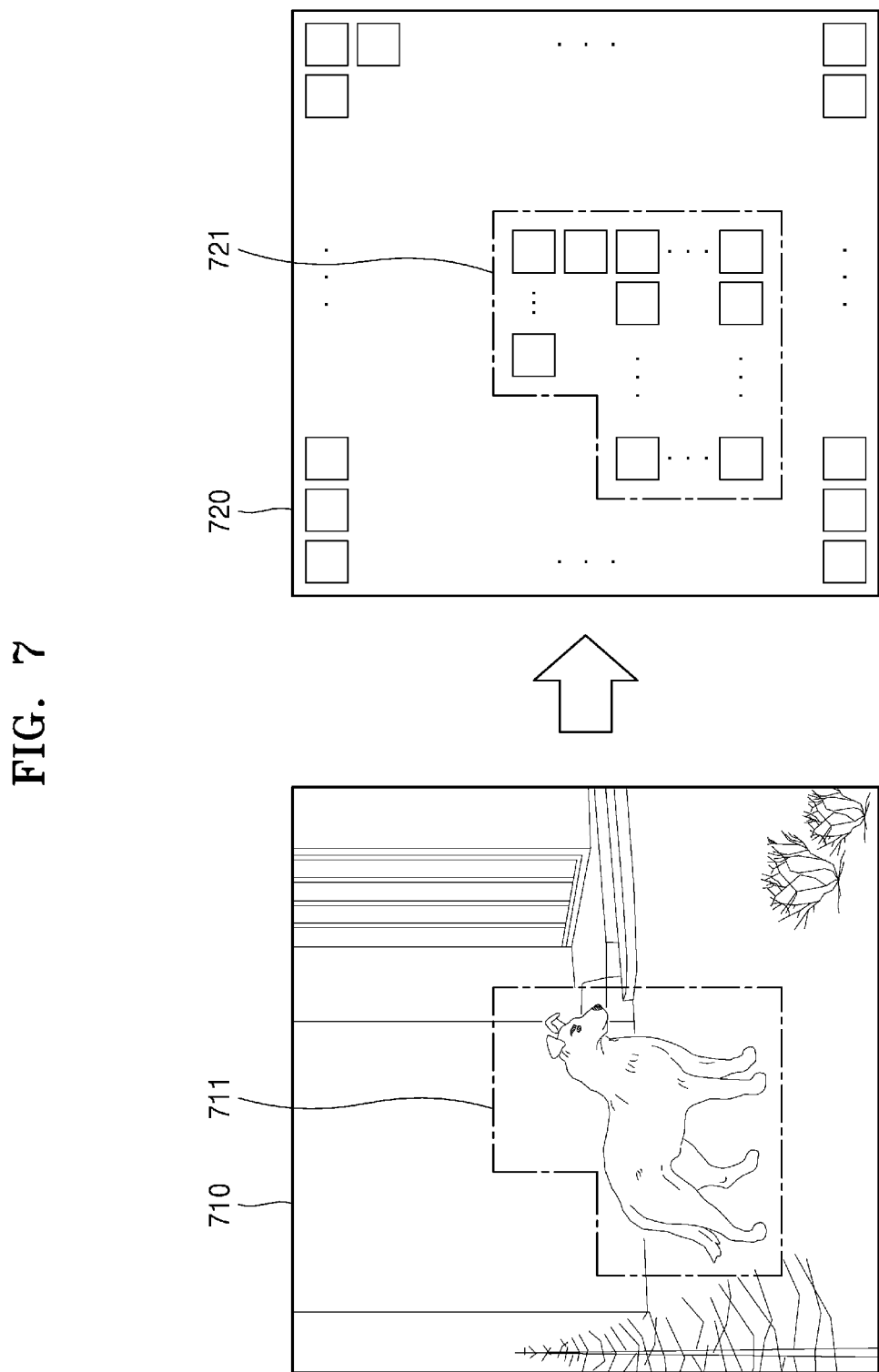
FIG. 7 is a diagram showing determination of an ROI of a pixel array based on an object of an image frame detected based on digital image processing according to an example embodiment.

FIG. 7 is a diagram showing determination of an ROI of a pixel array based on an object of an image frame detected based on digital image processing according to an example embodiment.

A processor may detect or the object of the image frame based on digital image processing. Algorithms such as machine learning, image clustering, and kernel based object detection may be used for digital image processing. In addition, it is obvious to those of ordinary skill in the art that various algorithms may be used for object detection or tracking. For example, the processor may detect or track the object by recognizing the object from the image frame based on a neural network.

The processor may detect a motion based on digital image processing. The detected motion may be binary information indicating whether there is a movement or not. Alternatively, the size of the motion may be set by measuring a variation in a pixel value. That is, when the variation in the pixel value is large, the size of the motion increases, and when the variation in the pixel value is small, the size of the motion decreases.

The processor may perform motion detection on all frames based on digital image processing. Alternatively, the processor may perform motion detection on a specific region. When the processor detects or tracks the object, the specific region may be set as a region including the object. Alternatively, the specific region may be set as a region including an ROI of the previous image.

The processor may determine an ROI 711 of an image frame 710 based on object detection or tracking. The processor may determine an ROI 721 of a pixel array 720 by obtaining addresses of pixels of the pixel array 720 corresponding to the ROI 711 of the image frame 710.

The processor may be configured to determine an ROI of a current image frame based on the ROI of the previous image. The processor may determine the ROI of the current image frame by performing motion detection, object detection, or tracking around the ROI of the previous image frame. Through this, accuracy and continuity may increase while reducing the amount of computation.

Location information of the ROI of the previous image frame may be stored in a memory and used. The location information of the ROI stored in the memory may accurately indicate an ROI having an arbitrary shape. Alternatively, to reduce the amount of information stored in the memory, the location information of the ROI may indicate an approximate region including the ROI. For example, the location information of the ROI may be indicated as a rectangular bounding box including the arbitrary shape.

Figure 8:
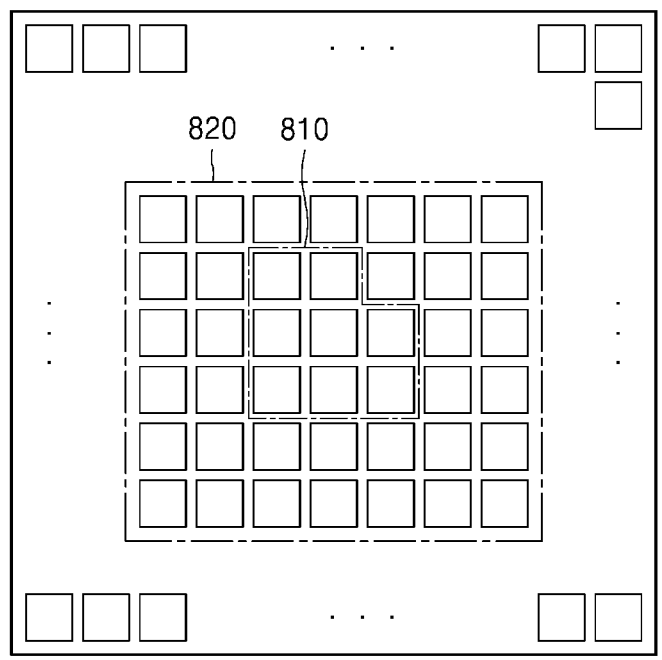
FIG. 8 is a diagram showing a processor that determines an ROI of a pixel array based on an address according to an example embodiment.

FIG. 8 is a diagram showing that a processor determines an ROI 820 of a pixel array based on an address according to an example embodiment.

A processor may obtain addresses of pixels in which a motion is detected between image frames based on a motion detection signal received from a motion detecting circuit. Also, the processor may obtain addresses of pixels corresponding to an ROI of an image frame.

The processor may determine the ROI of the pixel array based on the obtained addresses of pixels. The processor may determine pixels indicated by the obtained addresses as the ROI of the pixel array, determine some of the pixels indicated by the obtained addresses as the ROI of the pixel array, or determine the pixels indicated by the obtained addresses and surrounding pixels thereof as the ROI of the pixel array.

For example, the processor may determine the pixels 810 indicated by the obtained addresses and surrounding pixels thereof as the ROI 820 of the pixel array.

Figure 9:
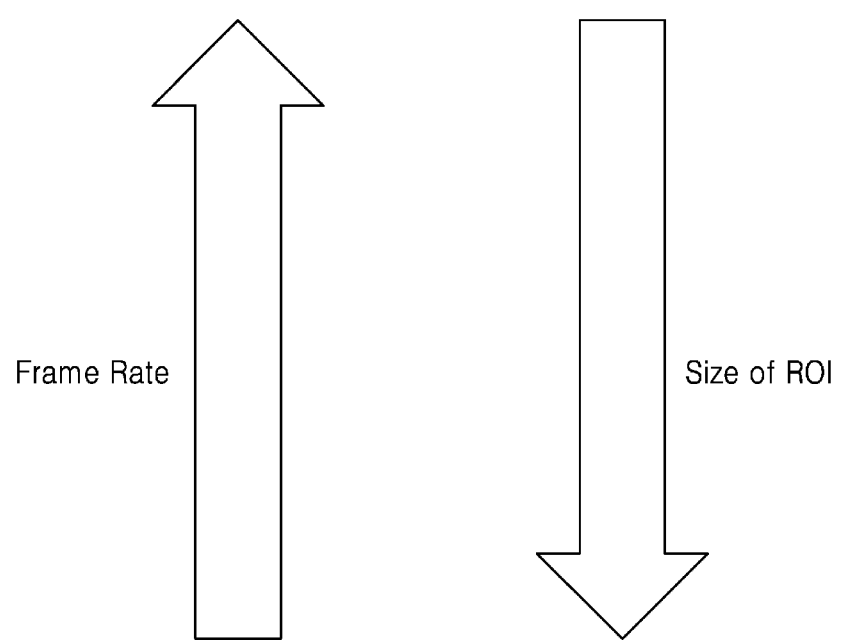
FIG. 9 is a diagram showing a processor that determines the size of an ROI of a pixel array according to an example embodiment.

FIG. 9 is a diagram showing that a processor determines the size of an ROI of a pixel array according to an example embodiment.

A processor may determine the ROI of the pixel array such that the size of the ROI of the pixel array is less than a previously determined maximum size.

The processor may determine the maximum size such that an integrated high-speed image sensor may operate at a previously determined frame rate in consideration of the time and resources required for readout, a storage capacity of a memory, and resources allocated for processing.

The processor may determine that the maximum size is inversely proportional to a first frame rate. For example, the processor may determine the maximum size such that the maximum size decreases when the first frame rate increases. When the size of the ROI is determined as the maximum size, the first frame rate and the size of the ROI may be inversely proportional to each other.

The size of the ROI of the pixel array is limited to the maximum size, which may ensure that the integrated high-speed image sensor operates at the previously determined frame rate. In addition, it is possible to adaptively maintain the previously determined frame rate by changing the maximum size in consideration of allocated resources, etc.

Figure 10:
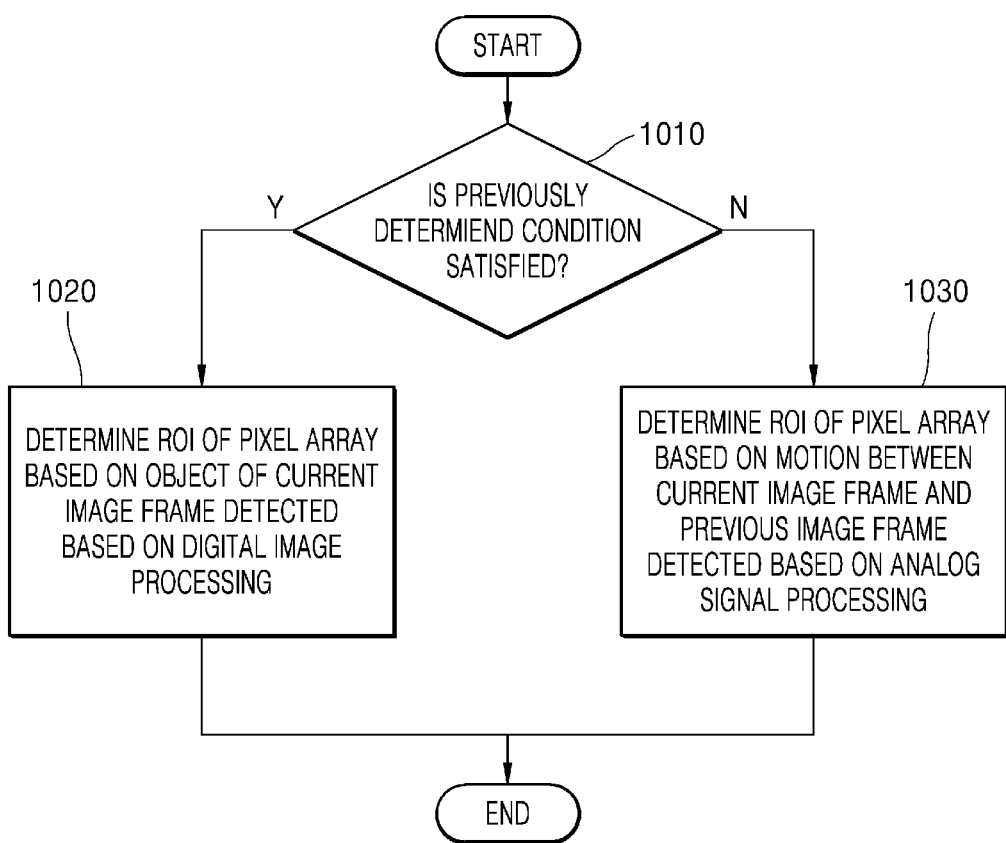
FIG. 10 is a flowchart showing a processor that determines an ROI of a pixel array based on analog signal processing or digital image processing according to an example embodiment.

FIG. 10 is a flowchart showing that a processor determines the ROI of a pixel array based on analog signal processing or digital image processing according to an example embodiment.

The ROI of the pixel array is determined based on an object after digital image processing that detects the object in an image frame. Meanwhile, to determine the ROI of the pixel array based on a motion, the motion is detected directly from output signals of pixel arrays.

Due to the time required for readout of image data, digital image processing, etc., the time required to determine the ROI of the pixel array based on the object may be longer than the time required to determine the ROI of the pixel array based on the motion. Meanwhile, because the object is detected based on digital image processing, the reliability of the ROI based on object detection may be higher than the reliability of the ROI based on motion detection.

The processor may determine the ROI of the pixel array in consideration of the reliability and time required to determine the ROI.

In operation 1010, the processor may determine whether a current image frame satisfies a previously determined condition. For example, when the current image frame is a key frame, the previously determined condition may be satisfied. In this regard, the key frame may be an image frame captured at a previously determined order, an image frame captured at a previously determined frame rate, or an image frame in which the motion is detected in a region equal to or larger than a previously determined size, but is not limited thereto.

In operation 1020, when the current image frame satisfies the previously determined condition, the processor may determine the ROI of the pixel array based on an object of the current image frame detected based on digital image processing. The processor may determine the ROI of the pixel array as an area in which the detected object is located. The processor may increase the reliability of the ROI by determining the ROI of the pixel array based on digital image processing.

In operation 1030, when the current image frame does not satisfy the previously determined condition, the processor may be configured to determine the ROI of the pixel array based on a motion between the current image frame and a previous image frame detected based on analog signal processing. The processor may determine the ROI of the pixel array as an area in which the motion is detected. The processor determines the ROI of the pixel array based on analog signal processing with respect to a plurality of image frames, thereby reducing the time required for determining the ROI.

In another example embodiment, when the current image frame is based on a key frame readout at a second frame rate or RONI image data, the processor may determine the ROI of the pixel array based on the object of the current image frame detected based on digital image processing.

Alternatively, when the current image frame is not based on the key frame readout at the second frame rate or the RONI image data, the processor may determine the ROI of the pixel array based on the motion between the current image frame and the previous image frame detected based on analog signal processing.

That is, in another example embodiment, when only the ROI image data is read out, the processor may determine the ROI of the pixel array based on analog signal processing, and when the ROI image data and the RONI image data are read out, the processor may determine the ROI of the pixel array based on digital image processing.

The processor may determine the ROI based on analog or digital processing such that the size of the ROI does not exceed a previously set maximum size. For example, when the size of the region in which the motion is detected is larger than the previously set maximum size, the processor may adjust the size of the ROI by including a region with a large motion in the region in which the motion is detected in the ROI and not including a region with a small motion in the region in which the motion is detected in the ROI. Alternatively, when the size of a region determined by using motion/object detection, object tracking, etc. is larger than the previously set maximum size, the processor may adjust the size of the ROI by including a region close to an ROI of the previous image frame in the ROI. Alternatively, the processor may adjust the size of the ROI by including a region close to the center of the image frame in the ROI.

Figure 11:
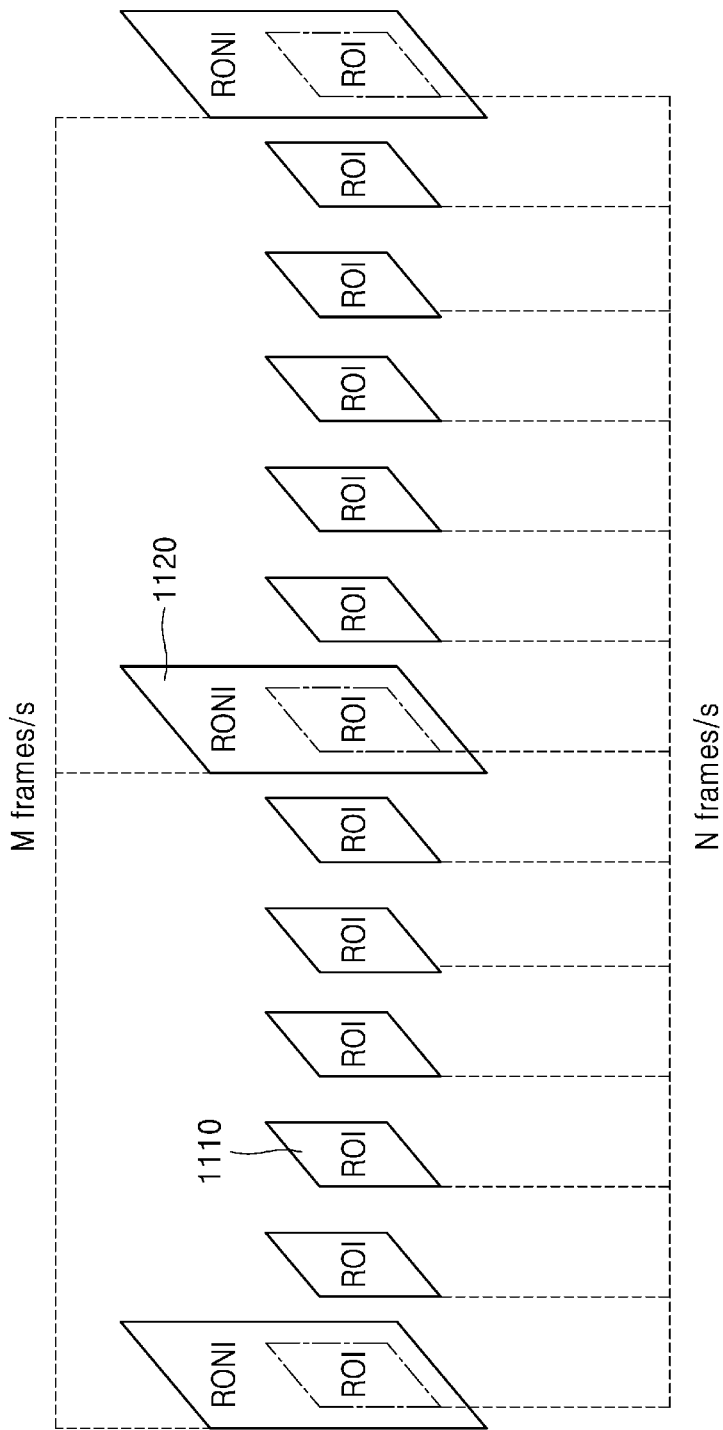
FIG. 11 illustrates image data generated by an integrated high-speed image sensor according to an example embodiment.

FIG. 11 illustrates image data generated by an integrated high-speed image sensor according to an example embodiment.

The integrated high-speed image sensor according to an example embodiment may be configured to read out output signals of pixels of an ROI at a first frame rate, and read out output signals of pixels of an RONI at a second frame rate to output ROI image data 1110 at the first frame rate and output RONI image data 1120 at the second frame rate.

Although it is shown in FIG. 11 that the size and location of the ROI are constant, the size and location of the ROI may change for each frame based on motion and object detection.

A processor may output the ROI image data 1110, the RONI image data 1120, or entire region image data according to an output mode. For example, the processor may output only the ROI image data 1110 at the first frame rate. For another example, the processor may generate the entire region image data by combining the ROI image data 1110 and the RONI image data 1120 and output the entire region image data at the first frame rate. For another example, the processor may output only the RONI image data 1120 at the second frame rate. For another example, in a normal output mode in which high-speed image sensing is not used, the processor may output the entire region image data at the second frame rate.

The integrated high-speed image sensor may be configured to capture the ROI image data 1110 and the RONI image data 1120 at different frame rates, thereby capturing an image at a wanted maximum frame rate without deteriorating resolution.

Figure 12:
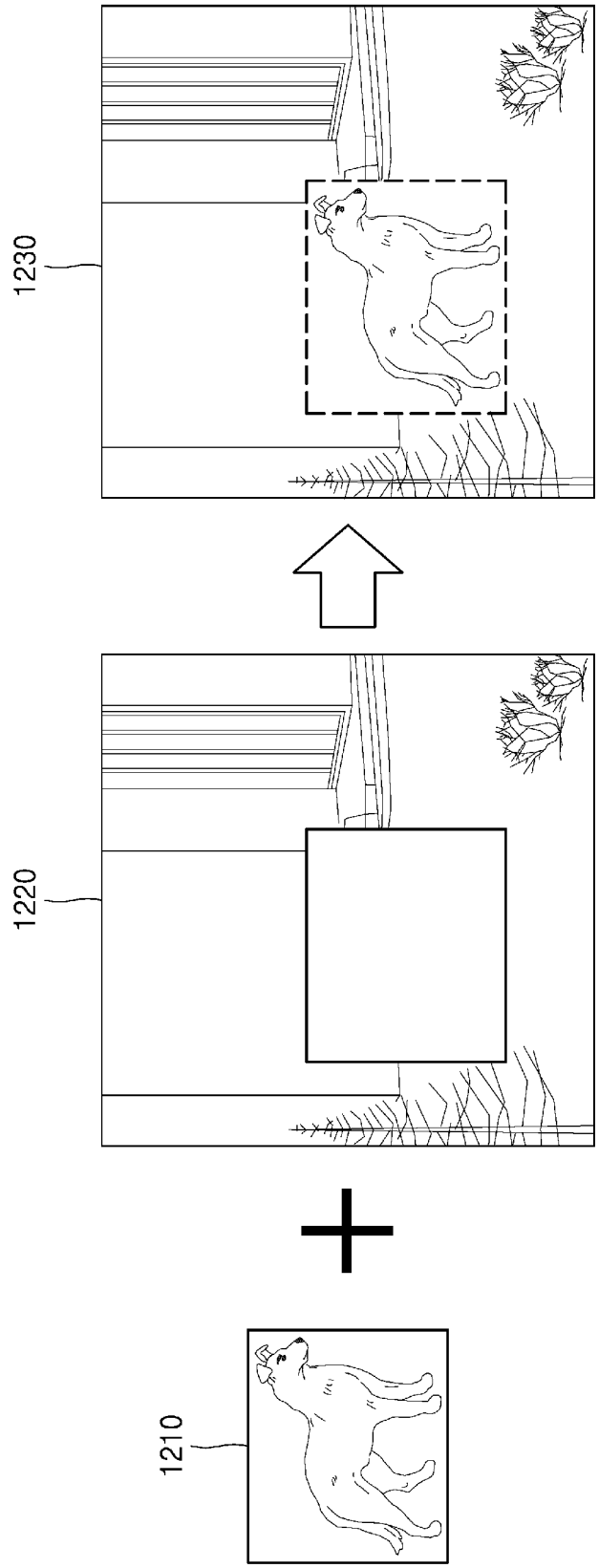
FIG. 12 is a diagram showing a method of generating entire region image data by combining ROI image data and region of non-interest (RONI) image data according to an example embodiment.

FIG. 12 is a diagram showing a method of generating entire region image data by combining ROI image data 1210 and RONI image data 1220 according to an example embodiment.

The processor may generate the ROI image data 1210 having a first frame rate based on output signals of pixels of an ROI. Also, the processor may generate the RONI image data 1220 having a second frame rate based on output signals of pixels of an RONI.

The processor may correct the ROI image data 1210 or the RONI image data 1220 such that the ROI image data 1210 and the RONI image data 1220 are seamlessly combined into a single (smooth and continuous) image frame. Pixel values of the ROI image data 1210 and the RONI image data 1220 may not be continuous due to a difference in an exposure time. Accordingly, the processor may generate one continuous entire image data 1230 by correcting the ROI image data 1210 or the RONI image data 1220.

The processor may generate the entire region image data 1230 by combining the ROI image data 1210 and the RONI image data 1220 constituting different frames. For example, the processor may generate an entire region image frame by combining an ROI image frame and an RONI image frame generated before the ROI image frame. For another example, the processor may generate the entire region image frame by combining the ROI image frame and an RONI image generated after the ROI image frame. For another example, the processor may generate an interpolated RONI image frame by interpolating the RONI image frames generated before and/or after the ROI image frame and generate the entire region image frame by combining the interpolated RONI image frame and the ROI image frame.

Because the ROI image data 1210 and the RONI image data 1220 constituting different frames are based on output signals of different pixels, the ROI image data 1210 and the RONI image data 1220 may not be continuous due to the difference in the exposure time or noise. For example, pixel values may be discontinuous at a boundary between the ROI image data 1210 and the RONI image data 1220. To this end, the processor may be configured to generate the entire region image data 1230 based on image registration.

For example, the processor may perform image registration by correcting the RONI image data 1220 based on the ROI image data 1210, or perform image registration by correcting the ROI image data 1210 based on the RONI image data 1220. For another example, the processor may perform image registration such that a boundary region between the ROI image data 1210 and the RONI image data 1220 is continuous.

In another example embodiment, the processor may set exposure times of pixels corresponding to an ROI and an RONI to be the same such that discontinuity does not occur between the ROI image data 1210 and the RONI image data 1220.

The processor may be configured to selectively output the ROI image data 1210, the RONI image data 1220, and the entire region image data 1230. When the processor outputs only the ROI image data 1210, a process of generating the entire region image data 1230 may be omitted.

Figure 13:
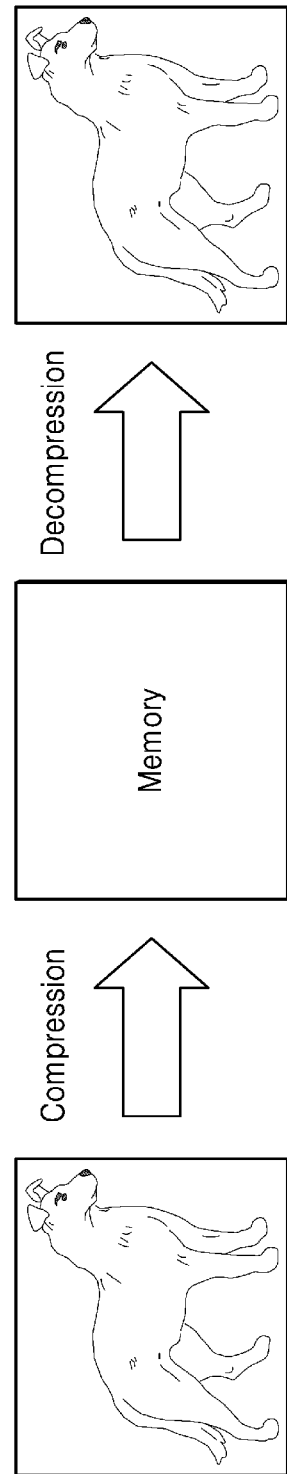
FIG. 13 is a diagram showing compressing and storing image data and decompressing read image data according to an example embodiment.

FIG. 13 is a diagram showing compressing and storing image data and decompressing read image data according to an example embodiment.

A processor may be configured to compress the image data, and a memory may be configured to store the compressed image data. Unlike this, the memory may be configured to store uncompressed image data.

The processor may be configured to compress the image data based on motion between image frames. Specifically, the processor may use information about a region in which motion is not detected between image frames, that is, a region in which pixel values are constant between image frames based on a motion detection signal, for compression of the image data. Compression efficiency may increase by compressing the image data using the information about the region in which pixel values are constant.

Also, the processor may be configured to compress the image data based on an ROI and an RONI. For example, when the processor compresses entire region image data, the processor may use information about an ROI updated at a first frame rate and an RONI updated at a second frame rate in the entire region image data for compression of the image data. Compression efficiency may increase by compressing the image data using information about an ROI updated at a first frame rate and an RONI updated at a second frame rate.

The processor may be configured to read and decompress the image data stored in the memory. The processor may decompress the image data based on information used for compression of the image data. Unlike this, the processor may be configured not to decompress the read image data. In this case, the processor may be configured to output information used for compression together with the compressed image data.

Figure 14:
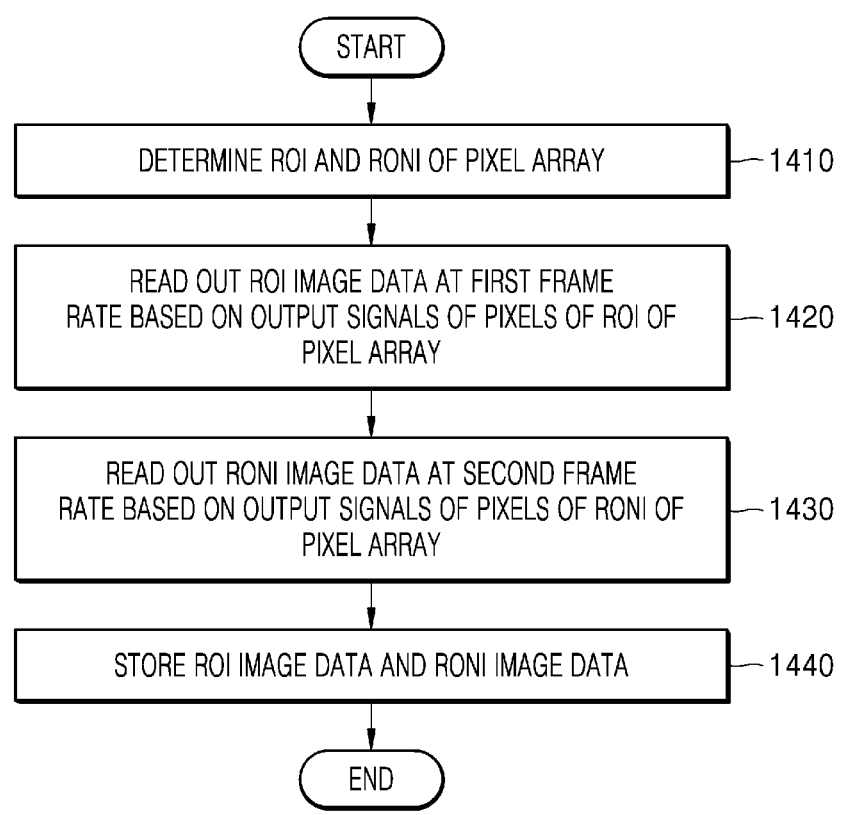
FIG. 14 is a flowchart illustrating an operation method of an integrated high-speed image sensor according to an example embodiment.

FIG. 14 is a flowchart illustrating an operation method of an integrated high-speed image sensor according to an example embodiment.

In operation 1410, a processor may determine an ROI and an RONI of a pixel array. The processor may determine the ROI of the pixel array based on a motion between image frames detected based on analog signal processing or an object of an image frame detected based on digital image processing.

In operation 1420, an analog signal processing circuit may read out ROI image data at a first frame rate based on output signals of pixels of the ROI of the pixel array. The pixels of the ROI may be selectively activated by a row selector circuit, and the output signals of the pixels of the ROI may be selectively read out by a column selector circuit.

In operation 1430, the analog signal processing circuit may read out RONI image data at a second frame rate based on output signals of pixels of the RONI of the pixel array. The second frame rate may be lower than the first frame rate.

In some cases, operation 1430 may be omitted. For example, when it is set to read out only the ROI image data at the first frame rate, operation 1430 may be omitted.

Further, operations 1420 and 1430 may be performed simultaneously, operation 1430 may be performed after operation 1420 is performed, or operation 1420 may be performed after operation 1430 is performed.

In operation 1440, the memory may store the ROI image data and the RONI image data. The memory may store the image data read out from the analog signal processing circuit and provide the image data to the processor according to a call from the processor.

In another example embodiment, operations 1410 to 1440 may be selectively performed or may be performed in a different order.

Figure 15:
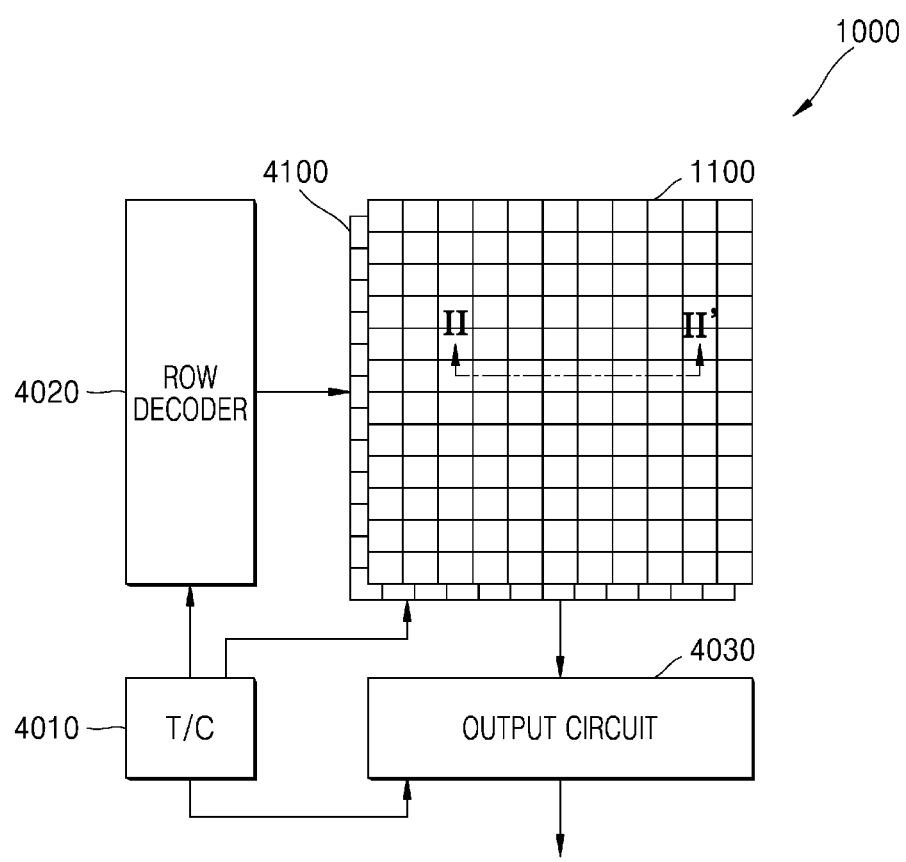
FIG. 15 is a schematic block diagram of an image sensor according to an example embodiment.

FIG. 15 is a schematic block diagram of an image sensor 1000 according to an example embodiment.

The image sensor 1000 of FIG. 15 may be an example of an integrated high-speed image sensor. The image sensor 1000 is not limited by FIG. 15 and the description with reference to FIG. 15. It is apparent to those skilled in the art that the image sensor 1000 may be implemented in a modified form within the range not departing from the essential feature of the image sensor 1000. For example, the image sensor 1000 may be implemented not to include a color/spectral filter 1100 or may be implemented to further include a microlens array or a polarization filter. As another example, the image sensor 1000 may be configured such that each pixel includes an ADC so that all pixels may capture an image at once.

Referring to FIG. 15, the image sensor 1000 may include a color/spectral filter 1100, a pixel array 4100, a timing controller 4010, a row decoder 4020, and an output circuit 4030. The output circuit 4030 may correspond to the readout circuit 360 in FIG. 3, The image sensor 1000 may include a charge coupled device (CCD) image sensor or a complementary metal oxide semiconductor (CMOS) image sensor, but is not limited thereto.

The color/spectral filter 1100 transmits or blocks light of different wavelength regions and includes a plurality of unit filters arranged in two dimensions. The pixel array 4100 may include a plurality of pixels that detect light of different wavelengths transmitted through the plurality of unit filters. Specifically, the pixel array 4100 may include two-dimensionally arranged pixels along a plurality of rows and columns. The row decoder 4020 may select one of the rows of the pixel array 4100 in response to a row address signal output from the timing controller 4010. The output circuit 4030 may output a photo-sensing signal from the plurality of pixels arranged along the selected row in units of columns. To this end, the output circuit 4030 may include a column decoder and an analog-to-digital converter (ADC). For example, the output circuit 4030 may include a plurality of ADCs respectively disposed for each column between the column decoder and the pixel array 4100, or one ADC disposed at an output terminal of the column decoder. The timing controller 4010, the row decoder 4020, and the output circuit 4030 may be implemented as a single chip or as separate chips. A processor for processing an image signal output through the output circuit 4030 may be implemented as a single chip together with the timing controller 4010, the row decoder 4020, and the output circuit 4030. The pixel array 4100 includes a plurality of pixels sensing light of different wavelengths. In this regard, an arrangement of the pixels may be implemented in various ways.

The image sensor 1000 may be employed in various high-performance optical devices or high-performance electronic devices. Such electronic devices may include, for example, smart phones, mobile phones, cell phones, personal digital assistants (PDA), laptops, PCs, various portable devices, home appliances, security cameras, medical cameras, automobiles, Internet of Things (IoT) devices or other mobile or non-mobile computing devices, but are not limited thereto.

In addition to the image sensor 1000, the electronic device may further include a processor controlling the image sensor 1000, for example, an application processor (AP). The electronic device may control a plurality of hardware or software components by driving an operating system or an application program through the processor, and may perform various data processing and operations. The processor may further include a graphic processing unit (GPU), a neural processing unit (NPU), and/or an image signal processor. When the processor includes the image signal processor, an image obtained by the image sensor 1000 may be processed, stored, and/or output by using the processor.

Figure 16:
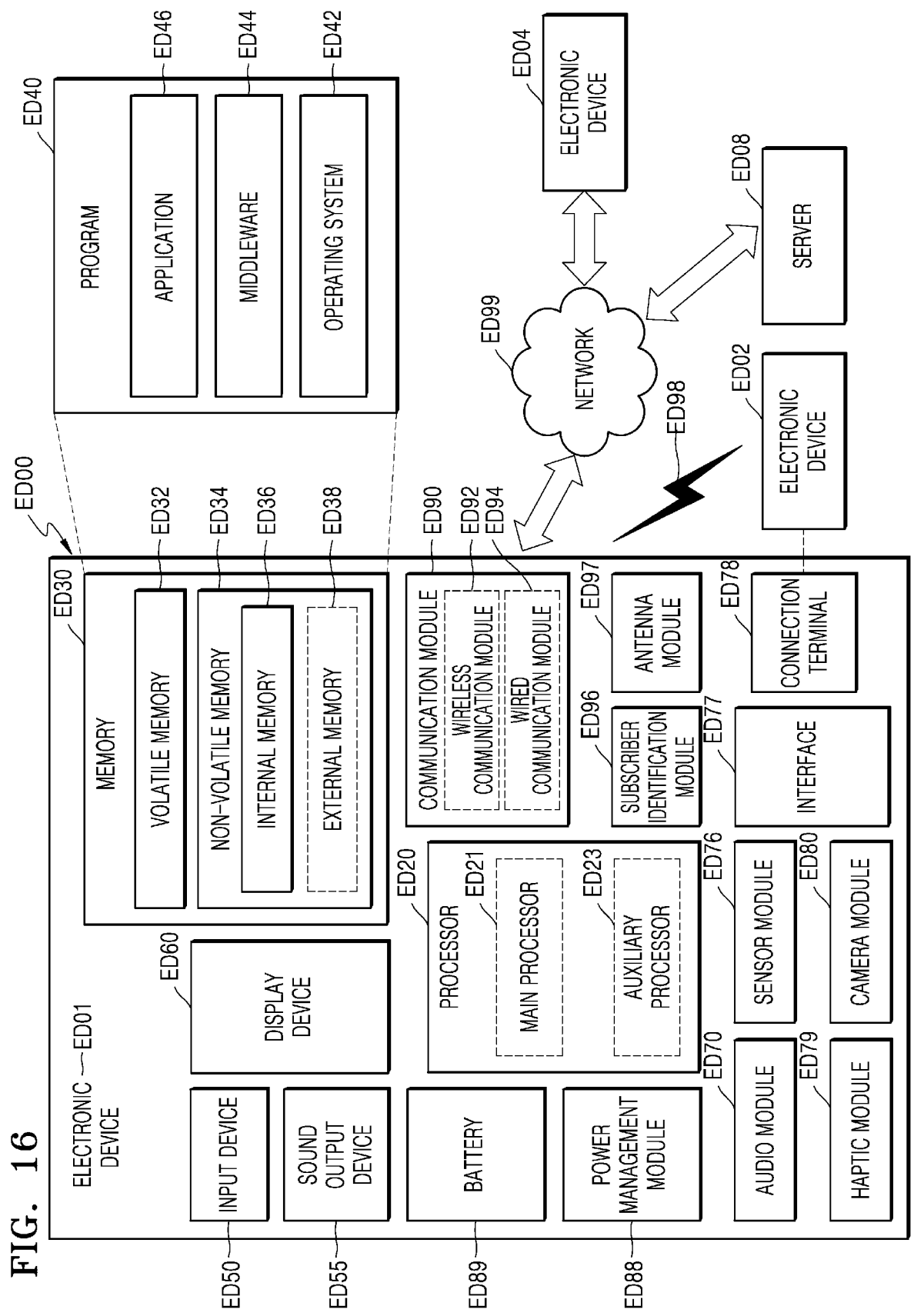
FIG. 16 is a block diagram illustrating an example of an electronic device including an image sensor.

FIG. 16 is a block diagram illustrating an example of an electronic device ED01 including the image sensor 1000.

Referring to FIG. 16, in a network environment ED00, the electronic device ED01 may communicate with another electronic device ED02 through a first network ED98 (such as a short-range wireless communication network) or may communicate with another electronic device ED04 and/or a server ED08 through a second network ED99 (a telecommunication network, etc.) The electronic device ED01 may communicate with the electronic device ED04 through the server ED08. The electronic device ED01 may include a processor ED20, a memory ED30, an input device ED50, a sound output device ED55, a display device ED60, an audio module ED70, a sensor module ED76, an interface ED77, a haptic module ED79, a camera module ED80, a power management module ED88, a battery ED89, a communication module ED90, a subscriber identification module ED96, and/or an antenna module ED97. In the electronic device ED01, some (e.g., the display device ED60) of these components may be omitted or other components may be added. Some of these components may be implemented as one integrated circuit. For example, the sensor module ED76 (a fingerprint sensor, an iris sensor, an illuminance sensor, etc.) may be implemented by being embedded in the display device ED60 (a display, etc.)

The processor ED20 may control one or a plurality of other components (hardware, software components, etc.) of the electronic device ED01 connected to the processor ED20 by executing software (e.g., a program ED40), and perform various data processing or operations. As part of data processing or operations, the processor ED20 may load commands and/or data received from other components (a sensor module ED76, a communication module ED90, etc.) into a volatile memory ED32, process the commands and/or data stored in the volatile memory ED32, and store resulting data in a non-volatile memory ED34. The processor ED20 may include a main processor ED21 (a central processing unit, an application processor, etc.) and an auxiliary processor ED23 (a graphics processing unit, an image signal processor, a sensor hub processor, a communication processor, etc.) that may operate independently or together. The auxiliary processor ED23 may use less power than the main processor ED21 and perform a specialized function.

The auxiliary processor ED23 may control functions and/or states related to some (the display device ED60, the sensor module ED76, the communication module ED90, etc.) of components of the electronic device ED01, on behalf of the main processor ED21 while the main processor ED21 is in an inactive state (a sleep state) or together with the processor ED21 while the main processor ED21 is in an active state (an application execution state). The auxiliary processor ED23 (the image signal processor, the communication processor, etc.) may be implemented as a part of other functionally related components (the camera module ED80, the communication module ED90, etc.)

The memory ED30 may store various data required by components (the processor ED20, the sensor module ED76, etc.) of the electronic device ED01. The data may include, for example, input data and/or output data with respect to software (the program ED40) and commands related thereto. The memory ED30 may include the volatile memory ED32 and/or the nonvolatile memory ED34. The nonvolatile memory ED32 may include an internal memory ED36 fixedly mounted on the electronic device ED01 and a removable external memory ED38.

The program ED40 may be stored as software in the memory ED30 and may include an operating system ED42, middleware ED44, and/or an application ED46.

The input device ED50 may receive commands and/or data to be used by a component (e.g., the processor ED20) of the electronic device ED01 from outside (e.g., a user) the electronic device ED01. The input device ED50 may include a microphone, a mouse, a keyboard, and/or a digital pen (a stylus pen, etc.)

The sound output device ED55 may output a sound signal to the outside of the electronic device ED01. The sound output device ED55 may include a speaker and/or a receiver. The speaker may be used for general purposes such as multimedia playback or recording playback, and the receiver may be used to receive incoming calls. The receiver may be integrated as a part of the speaker or may be implemented as an independent separate device.

The display device ED60 may visually provide information to the outside of the electronic device ED01. The display device ED60 may include a display, a hologram device, or a projector and a control circuit for controlling the corresponding device. The display device ED60 may include a touch circuitry configured to sense a touch, and/or a sensor circuitry (a pressure sensor, etc.) configured to measure the intensity of force generated by the touch.

The audio module ED70 may convert sound into an electric signal or, conversely, convert the electric signal into sound. The audio module ED70 may obtain sound through the input device ED50 or output sound through the sound output device ED55 and/or a speaker and/or headphones of other electronic device (the electronic device ED02, etc.) directly or wirelessly connected to the electronic device ED01.

The sensor module ED76 may sense an operating state (power, temperature, etc.) of the electronic device ED01 or an external environmental state (a user state, etc.), and generate an electrical signal and/or a data value corresponding to the sensed state. The sensor module ED76 may include a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor.

The interface ED77 may support one or a plurality of designated protocols that may be used to directly or wirelessly connect the electronic device ED01 to another electronic device (e.g., the electronic device ED02). The interface ED77 may include a High Definition Multimedia Interface (HDMI), a Universal Serial Bus (USB) interface, an SD card interface, and/or an audio interface.

The connection terminal ED78 may include a connector through which the electronic device ED01 may be physically connected to another electronic device (e.g., the electronic device ED02). The connection terminal ED78 may include an HDMI connector, a USB connector, an SD card connector, and/or an audio connector (a headphone connector, etc.)

The haptic module ED79 may convert an electrical signal into a mechanical stimulus (vibration, movement, etc.) or an electrical stimulus that the user may perceive through tactile or kinesthetic sense. The haptic module ED79 may include a motor, a piezoelectric element, and/or an electrical stimulation device.

The camera module ED80 may capture still images and moving images. The camera module ED80 may include a lens assembly including one or a plurality of lenses, the image sensor 1000 of FIG. 1 or 15, image signal processors, and/or flashes. The lens assembly included in the camera module ED80 may collect light emitted from a subject, which is an image capturing object.

The power management module ED88 may manage power supplied to the electronic device ED01. The power management module ED88 may be implemented as a part of a power management integrated circuit (PMIC).

The battery ED89 may supply power to components of the electronic device ED01. The battery ED89 may include a non-rechargeable primary cell, a rechargeable secondary cell, and/or a fuel cell.

The communication module ED90 may establish a direct (wired) communication channel and/or wireless communication channel between the electronic device ED01 and other electronic devices (the electronic device ED02, the electronic device ED04, the server ED08, etc.) and perform communication through the established communication channel. The communication module ED90 may include one or a plurality of communication processors operating independently of the processor ED20 (the application processor, etc.) and supporting direct communication and/or wireless communication. The communication module ED90 may include a wireless communication module ED92 (a cellular communication module, a short-range wireless communication module, and a Global Navigation Satellite System (GNSS, etc.) communication module) and/or a wired communication module ED94 (a Local Area Network (LAN) communication) module, a power line communication module, etc.). Among these communication modules, the corresponding communication module may communicate with other electronic devices through a first network ED98 (a short-distance communication network such as Bluetooth, WiFi Direct, or Infrared Data Association (IrDA)) or a second network ED99 (a telecommunication network such as a cellular network, Internet, or a computer network (LAN, WAN, etc.)) These various types of communication modules may be integrated into one component (a single chip, etc.) or implemented as a plurality of components (plural chips) separate from each other. The wireless communication module ED92 may use subscriber information (an International Mobile Subscriber Identifier (IMSI)) stored in the subscriber identification module ED96 to confirm and authenticate the electronic device ED01 in a communication network such as the first network ED98 and/or the second network ED99.

The antenna module ED97 may transmit or receive signals and/or power to or from the outside (e.g., other electronic devices). The antenna may include a radiator having a conductive pattern formed on a substrate (a PCB, etc.) The antenna module ED97 may include one or a plurality of antennas. When the antenna module ED97 includes the plurality of antennas, an antenna suitable for a communication method used in a communication network such as the first network ED98 and/or the second network ED99 may be selected from among the plurality of antennas by the communication module ED90. A signal and/or power may be transmitted or received between the communication module ED90 and another electronic device through the selected antenna. In addition to the antenna, other components (an RFIC, etc.) may be included as a part of the antenna module ED97.

Some of the components may be connected to each other through communication methods between peripheral devices (a bus, General Purpose Input and Output (GPIO), Serial Peripheral Interface (SPI), Mobile Industry Processor Interface (MIPI), etc.) and may interchange signals (commands, data, etc.)

The commands or data may be transmitted or received between the electronic device ED01 and the external electronic device ED04 through the server ED08 connected to the second network ED99. The other electronic devices ED02 and ED04 may be the same type as or different types from the electronic device ED01. All or some of operations performed by the electronic device ED01 may be performed by one or a plurality of other electronic devices ED02, ED04, and ED08. For example, when the electronic device ED01 needs to perform a function or service, the electronic device ED01 may request one or a plurality of other electronic devices to perform part or all of the function or service instead of performing the function or service by itself. The one or plurality of other electronic devices receiving such a request may perform an additional function or service related to the request, and transmit results of performing to the electronic device ED01. For this purpose, cloud computing, distributed computing, and/or client-server computing technologies may be used.

Figure 17:
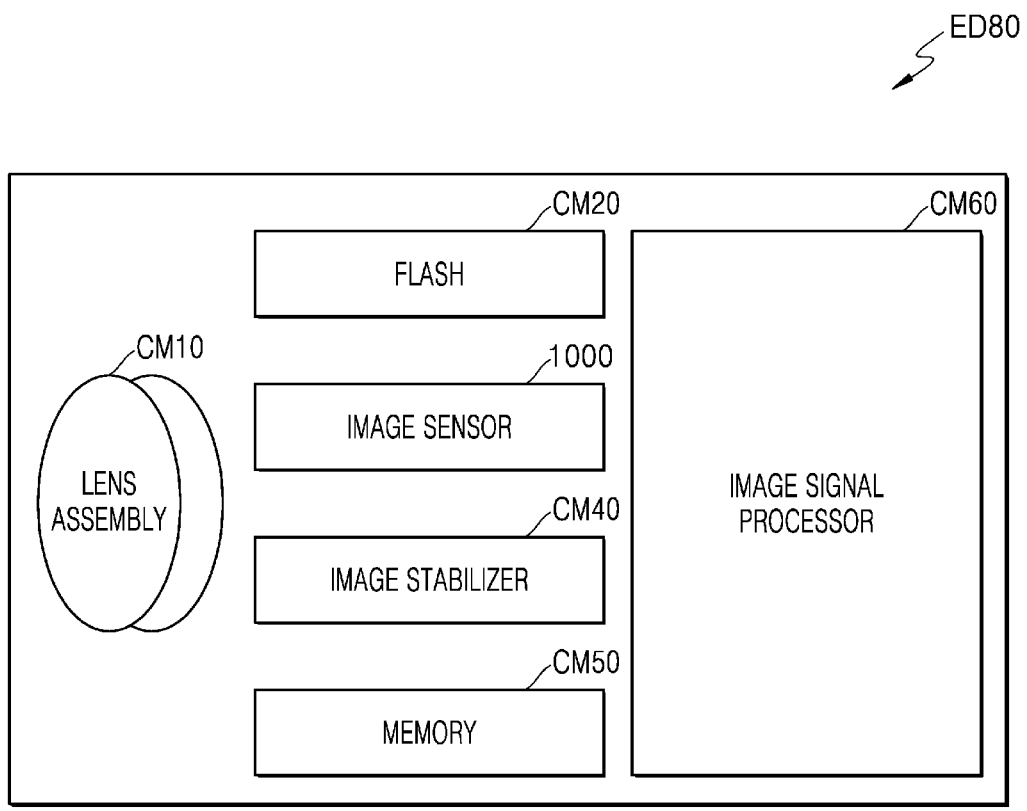
FIG. 17 is a block diagram illustrating a camera module of FIG. 16.

FIG. 17 is a block diagram illustrating the camera module ED80 of FIG. 16.

Referring to FIG. 17, the camera module ED80 may include a lens assembly CM10, a flash CM20, the image sensor 1000 (e.g., the integrated high-speed image sensor 100 of FIG. 1 or the image sensor 1000 of FIG. 15), an image stabilizer CM40, a memory CM50 (a buffer memory, etc.), and/or an image signal processor CM60. The lens assembly CM10 may collect light emitted from a subject, which is an image capturing object. The camera module ED80 may include a plurality of lens assemblies CM10. In this case, the camera module ED80 may be a dual camera, a 360 degree camera, or a spherical camera. Some of the plurality of lens assemblies CM10 may have the same lens properties (angle of view, focal length, auto focus, F number, optical zoom, etc.) or may have different lens properties. The lens assembly CM10 may include a wide-angle lens or a telephoto lens.

The flash CM20 may emit light used to enhance light emitted or reflected from the subject. The flash CM20 may include one or a plurality of light emitting diodes (Red-Green-Blue (RGB) LED, White LED, Infrared LED, Ultraviolet LED, etc.), and/or a Xenon Lamp.

The image sensor 1000 may be the image sensor described with reference to FIG. 1 or 15, and convert the light emitted or reflected from the subject and transmitted through the lens assembly CM10 into an electrical signal, thereby obtaining an image corresponding to the subject. The image sensor 1000 may include one or a plurality of sensors selected from image sensors having different properties, such as an RGB sensor, a black and white (BW) sensor, an IR sensor, or a UV sensor. Each of the sensors included in the image sensor 1000 may be implemented as a Charged Coupled Device (CCD) sensor and/or a Complementary Metal Oxide Semiconductor (CMOS) sensor.

The image stabilizer CM40 may move one or a plurality of lenses or image sensors 1000 included in the lens assembly CM10 in a specific direction in response to a movement of the camera module ED80 or the electronic device CM01 including the camera module ED80 or compensate for a negative influence of the movement by controlling operating characteristics (e.g., adjusting read-out timing) of the image sensor 1000. The image stabilizer CM40 may detect the movement of the camera module ED80 or the electronic device ED01 using a gyro sensor (not shown) or an acceleration sensor (not shown) disposed inside or outside the camera module ED80. The image stabilizer CM40 may be implemented optically or digitally.

The memory CM50 may store some or all data of an image obtained through the image sensor 1000 for a next image processing operation. For example, when a plurality of images are obtained at high speed, the obtained original data (Bayer-patterned data, high-resolution data, etc.) may be stored in the memory CM50, only a low-resolution image may be displayed and then used to transfer the original data of the selected image (user selection, etc.) to the image signal processor CM60. The memory CM50 may be integrated into the memory ED30 of the electronic device ED01 or may be configured as a separate memory operating independently.

The image signal processor CM60 may perform image processing on an image obtained through the image sensor 1000 or image data stored in the memory CM50. Image processing may include depth map generation, 3D modeling, panorama generation, feature point extraction, image synthesis, and/or image compensation (noise reduction, resolution adjustment, brightness adjustment, blurring/deblurring)), sharpening, softening, etc. The image signal processor CM60 may perform control (exposure time control, readout timing control, etc.) on components (the image sensor 1000, etc.) included in the camera module ED80. The image processed by the image signal processor CM60 may be stored back in the memory CM50 for additional processing or may be provided to external components (the memory ED30, the display device ED60, the electronic device ED02, the electronic device ED04, the server ED08, etc.) of the camera module ED80. The image signal processor CM60 may be integrated into the processor ED20 or configured as the processor ED20 and a separate processor operating independently. When the image signal processor CM60 is configured as the processor ED20 and the separate processor, the image processed by the image signal processor CM60 is subjected to additional image processing by the processor ED20 and then displayed through the display device ED60.

The electronic device ED01 may include a plurality of camera modules ED80 having different properties or functions. In this case, one of the plurality of camera modules ED80 may be a wide-angle camera and the other may be a telephoto camera. Similarly, one of the plurality of camera modules ED80 may be a front camera and the other may be a rear camera.

Figure 18:
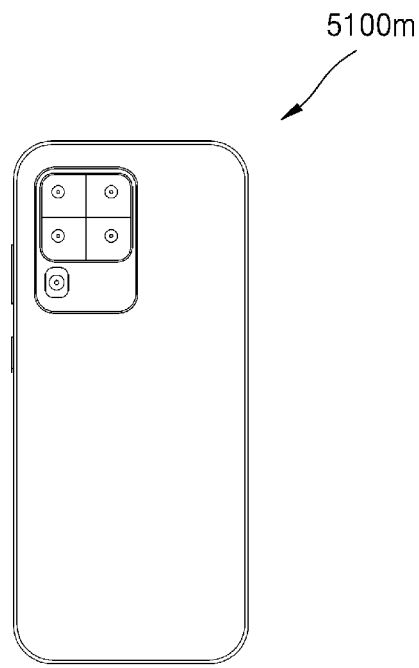
FIGS. 18 to 27 are diagrams illustrating platforms to which an image sensor is applicable.
Figure 19:
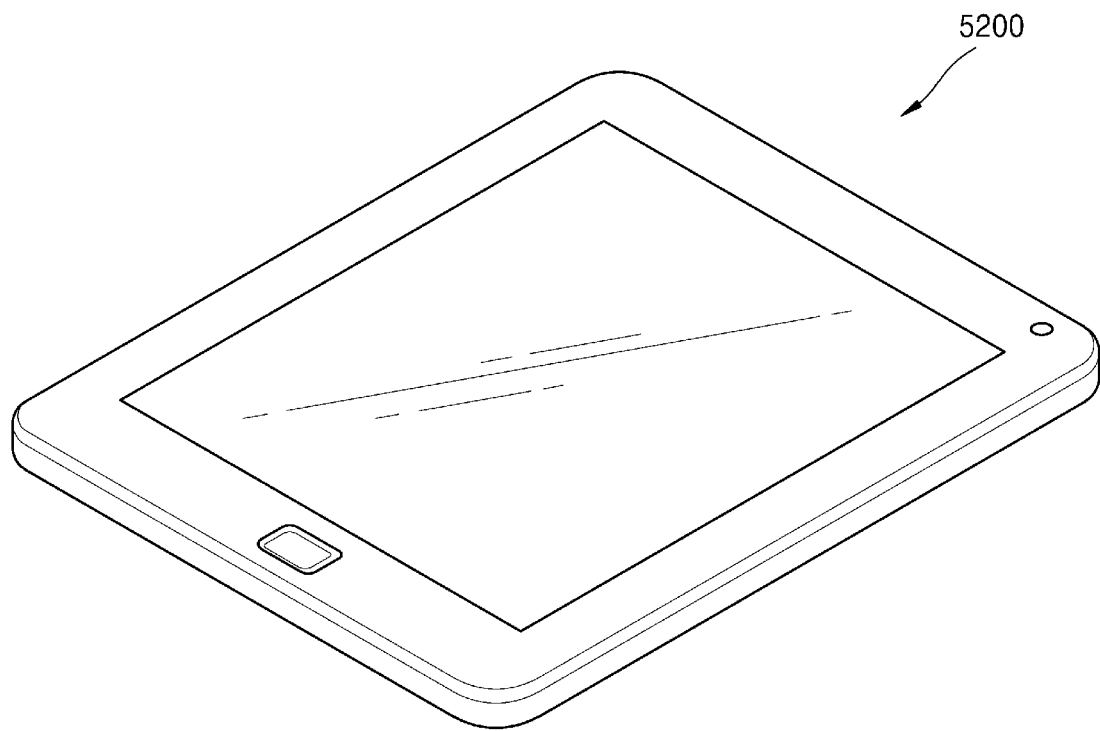
Figure 20:
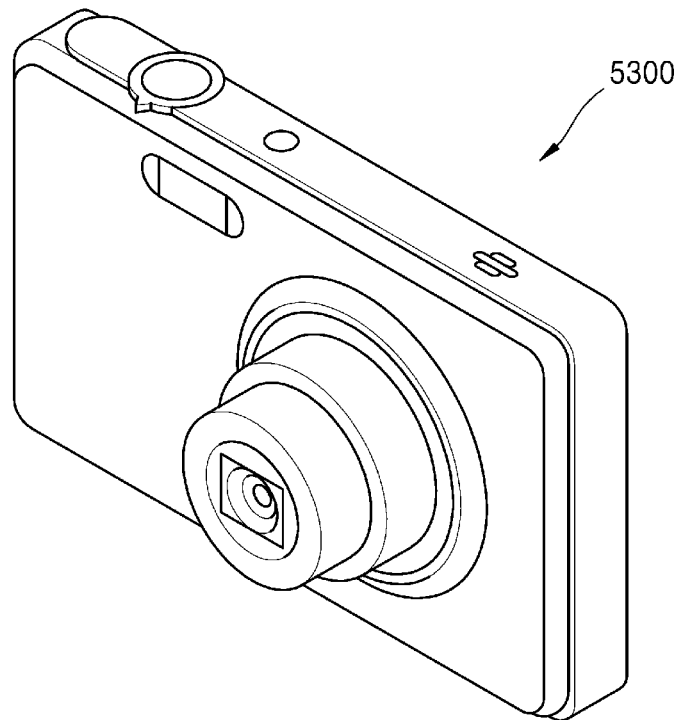
Figure 21:
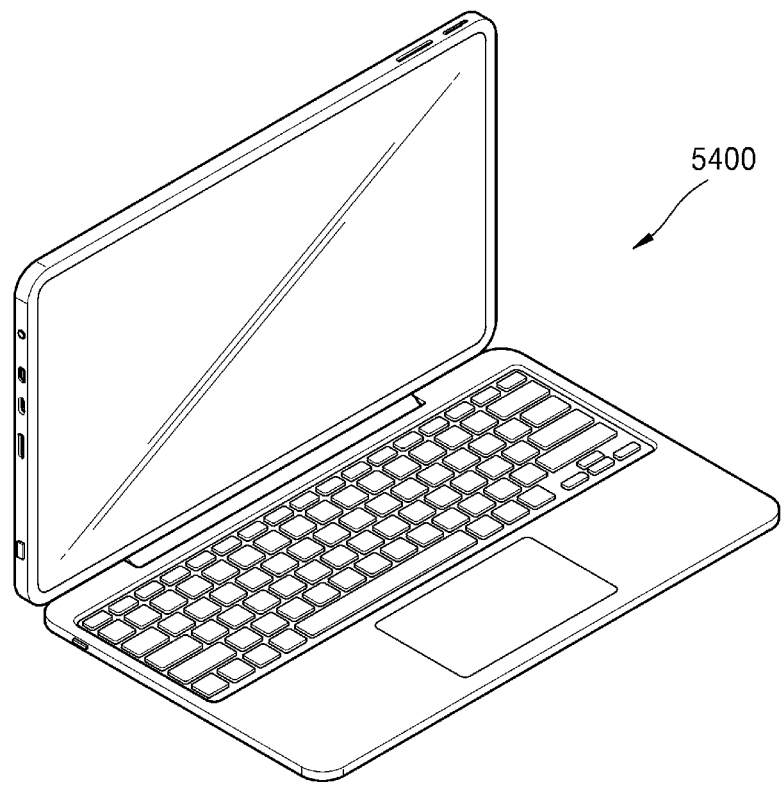
Figure 22:
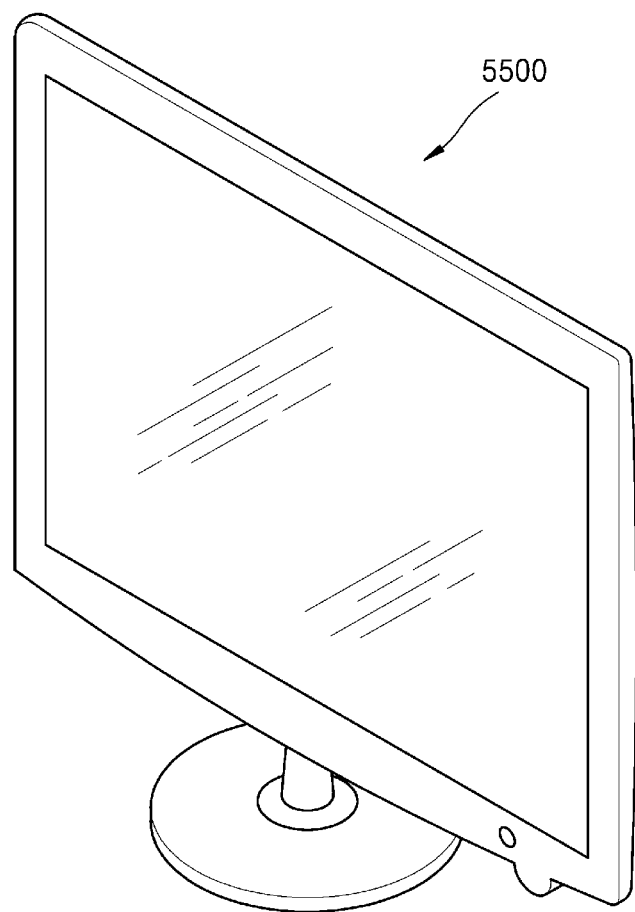

The image sensor 1000 according to embodiments may be applied to a mobile phone or a smart phone 5100m shown in FIG. 18, a tablet or smart tablet 5200 shown in FIG. 19, a digital camera or a camcorder 5300 shown in FIG. 20, a notebook computer 5400 shown in FIG. 21 or a television or a smart television 5500 shown in FIG. 22. For example, the smart phone 5100m or the smart tablet 5200 may include a plurality of high-resolution cameras each having a high-resolution image sensor mounted thereon. Using the high-resolution cameras, depth information of subjects in an image may be extracted, focusing/outfocusing of the image may be adjusted, or subjects in the image may be automatically identified.

Figure 23:
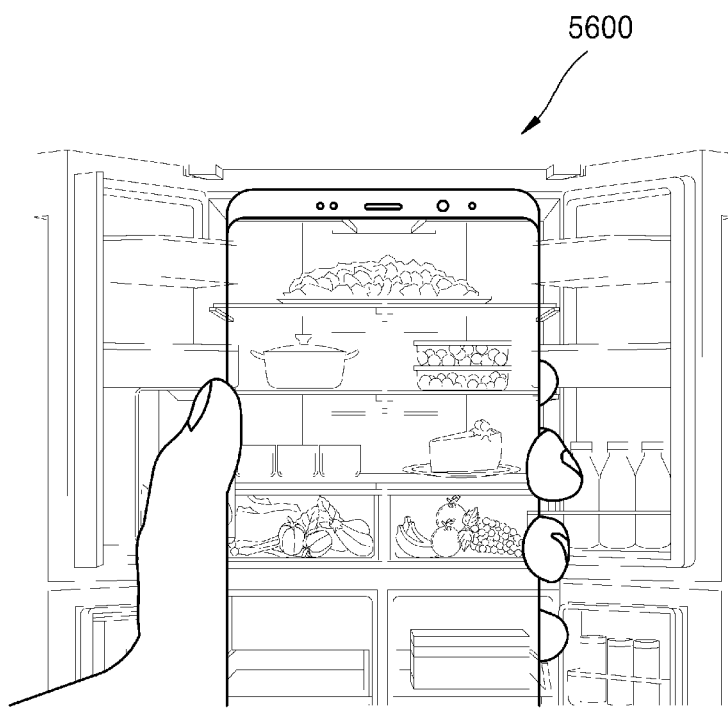
Figure 24:
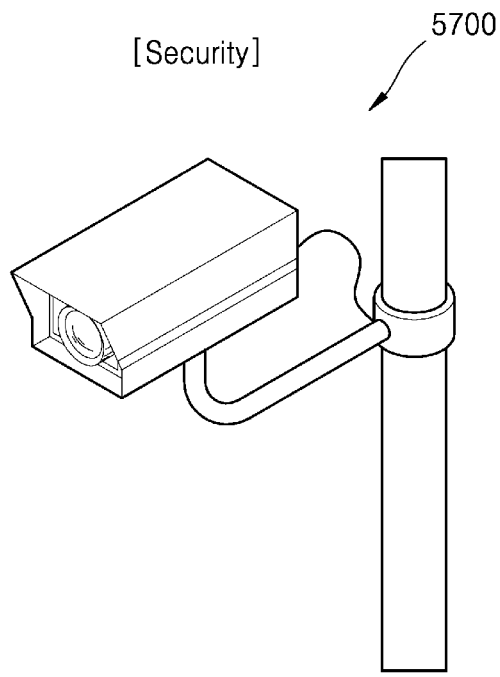
Figure 25:
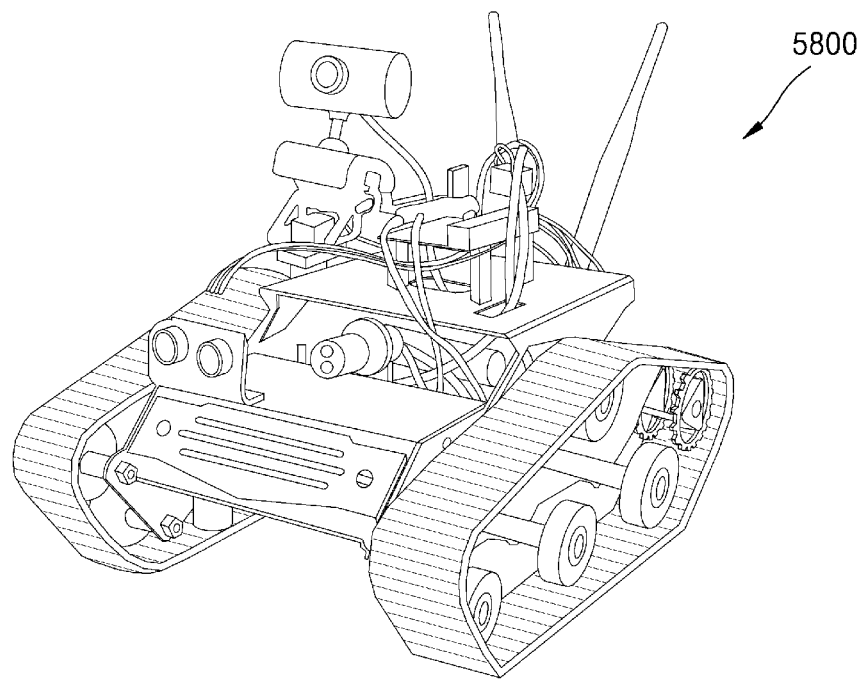
Figure 26:
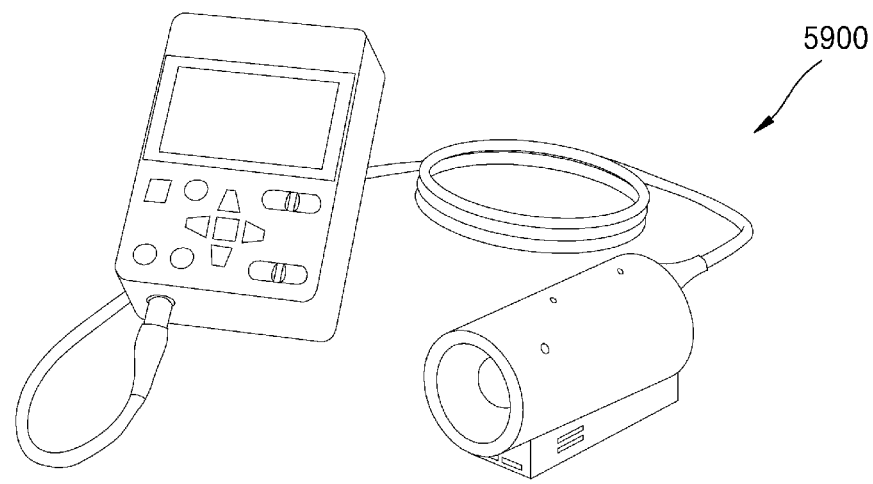

In addition, the image sensor 1000 may be applied to a smart refrigerator 5600 shown in FIG. 23, a security camera 5700 shown in FIG. 24, a robot 5800 shown in FIG. 25, a medical camera 5900 shown in FIG. 26, etc. For example, the smart refrigerator 5600 may automatically recognize food in the smart refrigerator 5600 using an image sensor, and inform the user of the existence of specific food, the type of input or output food, etc. to the user through a smartphone. The security camera 5700 may provide an ultra high-resolution image and may recognize an object or a person in the image even in a dark environment by using high sensitivity. The robot 5800 may be input at a disaster or industrial site that persons may not directly access to provide a high-resolution image. The medical camera 5900 may provide a high-resolution image for diagnosis or surgery, and may dynamically adjust a field of view.

Figure 27:
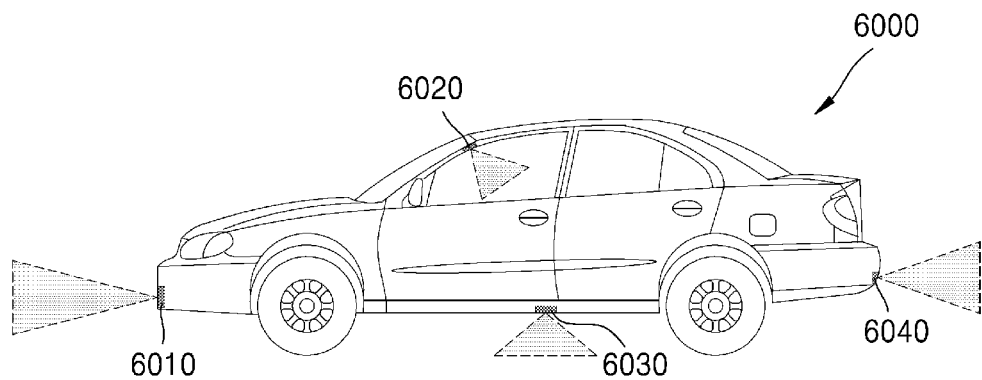

Also, the image sensor 1000 may be applied to a vehicle 6000 as shown in FIG. 27. The vehicle 6000 may include a plurality of vehicle cameras 6010, 6020, 6030, and 6040 arranged at various positions. Each of the vehicle cameras 6010, 6020, 6030, and 6040 may include an image sensor according to embodiments. The vehicle 6000 may provide a variety of information about the inside or surroundings of the vehicle 6000 to a driver by using the plurality of vehicle cameras 6010, 6020, 6030, and 6040, automatically recognize an object or person in the image and provide information necessary for autonomous driving and advanced driver assistance system (ADAS).

Meanwhile, the above described embodiments may be written in a program executable on a computer, and may be implemented on a general purpose digital computer that operates the program using a computer readable recording medium. In addition, the structure of data used in the above described embodiments may be recorded on a computer readable recording medium through various means. The computer readable recording medium includes a storage medium such as a magnetic storage medium (e.g., ROM, floppy disk, hard disk, etc.), an optical reading medium (e.g., CD ROM, DVD, etc.).

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An integrated image sensor comprising:
a pixel array;
a processor configured to determine a region of interest (ROI) and a region of non-interest (RONI) of the pixel array;
an analog signal processing circuit configured to read out ROI image data from the ROI of the pixel array at a first frame rate and read out RONI image data from the RONI of the pixel array at a second frame rate; and
a memory storing the ROI image data and the RONI image data,
wherein the processor is further configured to:
when a current image frame satisfies a previously determined condition, determine the ROI of the pixel array as an area in which an object is detected based on digital image processing of the current image frame, and
when the current image frame does not satisfy the previously determined condition, determine the ROI of the pixel array as an area in which a motion is detected based on analog signal processing of the current image frame and a previous image frame.

2. The integrated image sensor of 1, wherein the processor is further configured to,
when a current image frame is based on the RONI image data read out at the second frame rate, determine the ROI of the pixel array as an area in which an object is detected based on digital image processing of the current image frame, and
when the current image frame is not based on the RONI image data read out at the second frame rate, determine the ROI of the pixel array as an area in which a motion based on analog signal processing of the current image frame and a previous image frame.

3. The integrated image sensor of 1, wherein the analog signal processing circuit comprises a motion detecting circuit configured to calculate a difference between a first output signal of the pixel array corresponding to a current image frame and a second output signal of the pixel array corresponding to a previous image frame, and detect a motion between the current image frame and the previous image frame based on the difference between the first output signal and the second output signal, and
wherein the processor is further configured to determine the ROI based on the detected motion.

4. The integrated image sensor of 1, further comprising a column selector circuit configured to output a column selection signal corresponding to columns of pixels of the ROI,
wherein the analog signal processing circuit comprises a readout circuit configured to image read out based on the column selection signal.

5. The integrated image sensor of 1, wherein the processor is further configured to detect an object of an image frame based on machine learning.

6. The integrated image sensor of 1, wherein the processor is further configured to generate entire region image data by combining the ROI image data and the RONI image data.

7. The integrated image sensor of 6, wherein the processor is further configured to generate the entire region image data based on image registration.

8. The integrated image sensor of 6, wherein the processor is further configured to selectively output the ROI image data and the entire region image data.

9. The integrated image sensor of 1, wherein the processor is further configured to correct the ROI image data or the RONI image data to allow the ROI image data and the RONI image data to be combined as a single seamless image frame.

10. The integrated image sensor of 1, wherein the processor is further configured to compress the ROI image data or the RONI image data, and
wherein the memory stores the compressed ROI image data or the compressed RONI image data.

11. The integrated image sensor of 1, wherein the processor is further configured to compress the ROI image data based on a motion between consecutive image frames.

12. The integrated image sensor of 1, wherein the processor is further configured to
read the ROI image data or the RONI image data stored in the memory, and
decompress the read ROI image data or the read RONI image data.

13. The integrated image sensor of 1, wherein the processor is further configured to determine the ROI such that a size of the ROI is less than a previously determined maximum size, and
wherein a current maximum size of the ROI is inversely proportional to the first frame rate.

14. An operation method of an integrated image sensor, the operation method comprising:
determining a region of interest (ROI) and a region of non-interest (RONI) of a pixel array;
reading out ROI image data from the ROI of the pixel array at a first frame rate;
reading out RONI image data the RONI of the pixel array at a second frame rate; and
storing the ROI image data and the RONI image data,
wherein the determining of the ROI and the RONI of the pixel array comprises:
when a current image frame satisfies a previously determined condition, determining the ROI of the pixel array as an area in which an object is detected based on digital image processing of the current image frame, and
when the current image frame does not satisfy the previously determined condition, determining the ROI of the pixel array as an area in which a motion is detected based on analog signal processing of the current image frame and a previous image frame.

15. An image sensor comprising:
a pixel array;
a processor configured to determine a region of interest (ROI) and a region of non-interest (RONI) of the pixel array; and
an analog signal processing circuit comprising a row selector configured to activate the pixel arrays row by row, and a column selector configured to read out ROI image data from the ROI of the pixel array at a first frame rate and read out RONI image data from the RONI of the pixel array at a second frame rate that is lower than the first frame rate,
wherein the processor is further configured to combine the ROI image data and the RONI image data as a single image frame, and
wherein the processor is further configured to:
when a current image frame satisfies a previously determined condition, determine the ROI of the pixel array as an area in which an object is detected based on digital image processing of the current image frame, and
when the current image frame does not satisfy the previously determined condition, determine the ROI of the pixel array as an area in which a motion is detected based on analog signal processing of the current image frame and a previous image frame.

* * * * *